United States Patent
Sprenkle et al.

(10) Patent No.: US 12,340,967 B2
(45) Date of Patent: Jun. 24, 2025

(54) METHODS, MEDIUMS, AND SYSTEMS FOR IDENTIFYING TUNABLE DOMAINS FOR ION BEAM SHAPE MATCHING

(71) Applicant: Applied Materials, Inc., Santa Clara, CA (US)

(72) Inventors: Richard Allen Sprenkle, South Hamilton, MA (US); Richard White, Newmarket, NH (US); Eric Donald Wilson, Rockport, MA (US); Shane Conley, Gloucester, MA (US); Ana Samolov, Somerville, MA (US); Nilay A. Pradhan, Santa Clara, CA (US)

(73) Assignee: Applied Materials, Inc., Santa Clara, CA (US)

( * ) Notice: Subject to any disclaimer, the term of this patent is extended or adjusted under 35 U.S.C. 154(b) by 639 days.

(21) Appl. No.: 17/375,488

(22) Filed: Jul. 14, 2021

(65) Prior Publication Data
US 2023/0013095 A1    Jan. 19, 2023

(51) Int. Cl.
*H01J 3/12* (2006.01)
*G05B 19/4155* (2006.01)
*G06N 20/00* (2019.01)

(52) U.S. Cl.
CPC ........... *H01J 3/12* (2013.01); *G05B 19/4155* (2013.01); *G06N 20/00* (2019.01); *G05B 2219/36199* (2013.01)

(58) Field of Classification Search
None
See application file for complete search history.

(56) References Cited

U.S. PATENT DOCUMENTS

2005/0092939 A1* 5/2005 Coss ............... H01J 37/3171
                                                   700/121
2006/0284114 A1* 12/2006 Olson ............. H01J 37/3171
                                                   250/492.21

(Continued)

FOREIGN PATENT DOCUMENTS

| CN | 109165400 A | 1/2019 |
| JP | 2020161470 A | 10/2020 |

(Continued)

OTHER PUBLICATIONS

International Search Report and Written Opinion dated Oct. 21, 2022, for the International Patent Application No. PCT/US2022/034672, filed on Jun. 23, 2022, 6 pages.

*Primary Examiner* — David Earl Ogg
(74) *Attorney, Agent, or Firm* — KDW Firm, PLLC

(57) ABSTRACT

Techniques for adjusting the shape of an ion beam are described. Characteristics of a desired beam shape may be defined. The ion beam generator may include beam shaping elements associated with tunable parameters that can be set in combination with each other. A search space for the possible combinations is defined. A set of exploratory points in the search space are measured and used to interpolate a large number of interpolated points based on a regression model. Interpolated points that are associated with low confidence values may be measured. Based on the measured and interpolated points, clusters of tunable parameter combinations may be identified for evaluation. The clusters are evaluated for stability and sensitivity, and one of the clusters is selected based on the evaluation. The ion beam generator may be configured based on the selected cluster.

21 Claims, 12 Drawing Sheets

(56) References Cited

U.S. PATENT DOCUMENTS

| | | | | |
|---|---|---|---|---|
| 2008/0245957 | A1* | 10/2008 | Gupta | H01J 37/3171 |
| | | | | 250/252.1 |
| 2009/0084672 | A1 | 4/2009 | MacCrimmon | |
| 2019/0120777 | A1 | 4/2019 | Fukuda | |
| 2020/0026196 | A1* | 1/2020 | Cao | G03F 7/70125 |
| 2020/0312616 | A1* | 10/2020 | Takemura | H01J 37/3171 |

FOREIGN PATENT DOCUMENTS

| | | |
|---|---|---|
| TW | 201734955 A | 10/2017 |
| TW | 201942769 A | 11/2019 |
| TW | 202004359 A | 1/2020 |
| WO | 03021630 A1 | 3/2003 |
| WO | 2007109252 A2 | 9/2007 |

* cited by examiner

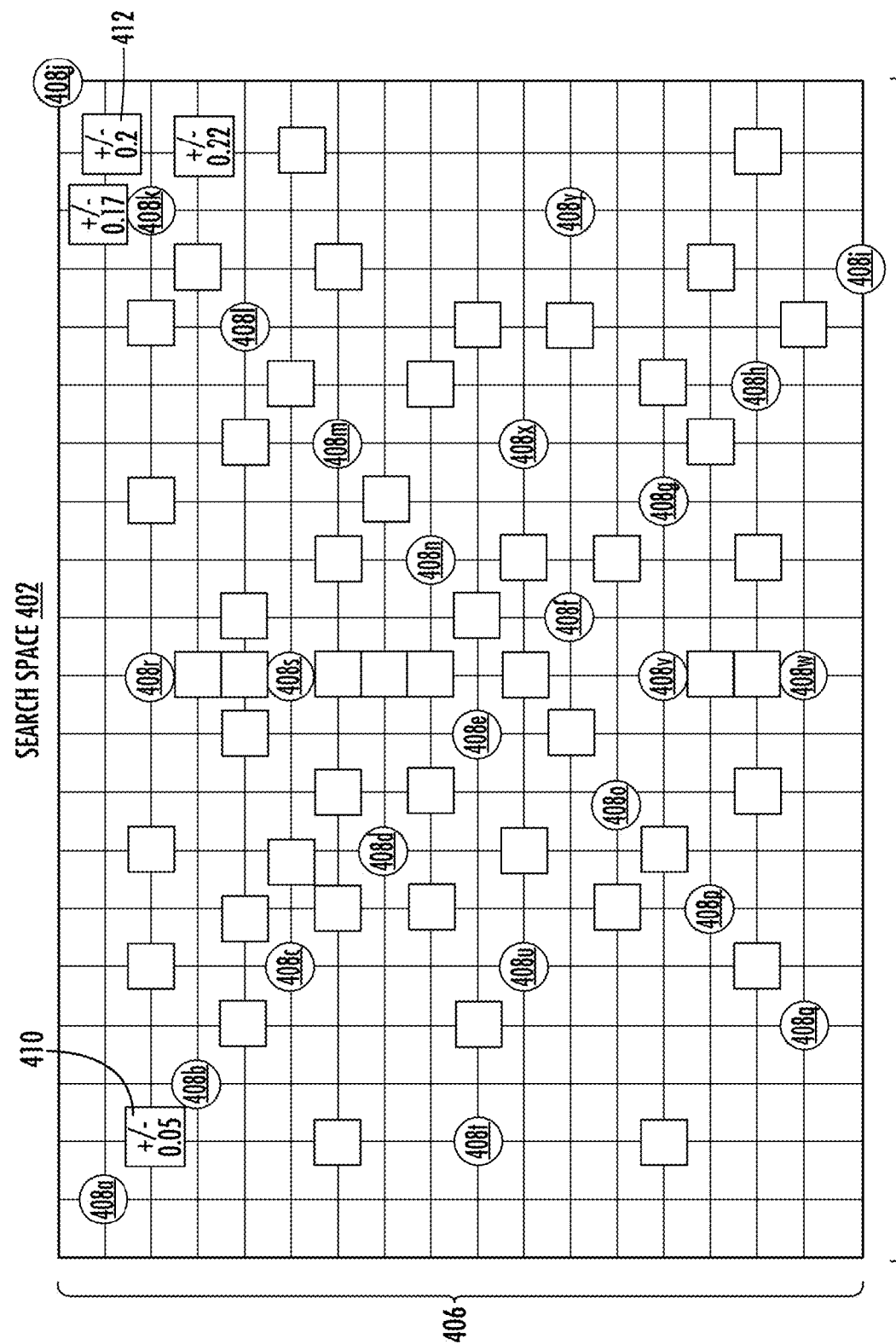

METHODS, MEDIUMS, AND SYSTEMS FOR IDENTIFYING TUNABLE DOMAINS FOR ION BEAM SHAPE MATCHING

BACKGROUND

An ion beam is a beam of charged particles produced by an ion beam generator. Ion beams are used in a number of fields to alter a surface; for example, they are often used in electronics manufacturing. Ion beams can be used to implant ions into a material (referred to as "ion implantation"), to etch a material, to clean an etched surface, etc.

BRIEF SUMMARY

In one aspect, a computer-implemented method includes receiving one or more desired beam shape parameters for an ion beam and one or more tunable parameters for an ion beam generator configured to generate the ion beam, selecting a set of exploratory points within a search space, each point in the search space representing a combination of values for the tunable parameters, for each of the exploratory points, receiving measured beam shape parameters based on the combination of values for the tunable parameters defined by the respective exploratory point, training a regression model configured provide predicted beam shape parameters for interpolated points in proximity to the exploratory points, defining a plurality of clusters within the search space based on the predicted beam shape parameters and the measured beam shape parameters, evaluating the plurality of clusters for at least one of a stability or a sensitivity of the tunable parameters within each respective cluster, selecting one of the plurality of clusters based on the evaluating, and outputting tuning settings for the combination of tunable parameters corresponding to the selected cluster.

The regression model may be configured to provide a confidence value for each of the interpolated points, and further includes identifying that one of the plurality of clusters is associated with a low-confidence interpolated point having a confidence value above or below a predetermined threshold value, and receiving a measurement of a shape of the ion beam using the combination of values of the tunable parameters defined by the low-confidence interpolated point.

Evaluating the plurality of clusters may include selecting a cluster and identifying the combination of values of the tunable parameters for the selected cluster, adjusting a value of a first one of the tunable parameters, and identifying an effect of the adjusting on a value for a shape of the ion beam.

Selecting one of the plurality of clusters based on the evaluating may include selecting a cluster having a greatest number of tunable parameters having values that have been locked in place.

Selecting one of the plurality of clusters based on the evaluating may include identifying that a first tunable parameter of a cluster under evaluation has a substantially linear effect on a first one of the beam shape parameters and a substantially neutral effect on a second one of the beam shape parameters, identifying that a second tunable parameter of the cluster under evaluation has a substantially neutral effect on the first one of the beam shape parameters and a substantially linear effect on a the second one of the beam shape parameters, and selecting the cluster under evaluation. Other technical features may be readily apparent to one skilled in the art from the following figures, descriptions, and claims.

Adjusting the first one of the tunable parameters may cause the value for the shape of the ion beam to move substantially non-linearly, and the computer-implemented method may further include discarding the selected cluster from consideration.

Adjusting the first one of the tunable parameters may cause the value for the shape of the ion beam to move by less than a predetermined threshold amount, or causes the value for the shape of the ion beam to move substantially parabolically, and the computer implemented method may further include selecting a value for the first one of the tunable parameters and locking the first one of the tunable parameters at the selected value.

These techniques may be embodied as computer-implemented methods, as well as non-transitory computer-readable mediums storing instructions for performing the methods, apparatuses configured to perform the methods, etc. Other technical features may be readily apparent to one skilled in the art from the following figures, descriptions, and claims.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 4B depicts an example of interpolated points in proximity to the measured exploratory values in accordance with one embodiment.

DETAILED DESCRIPTION

Figure 1A:
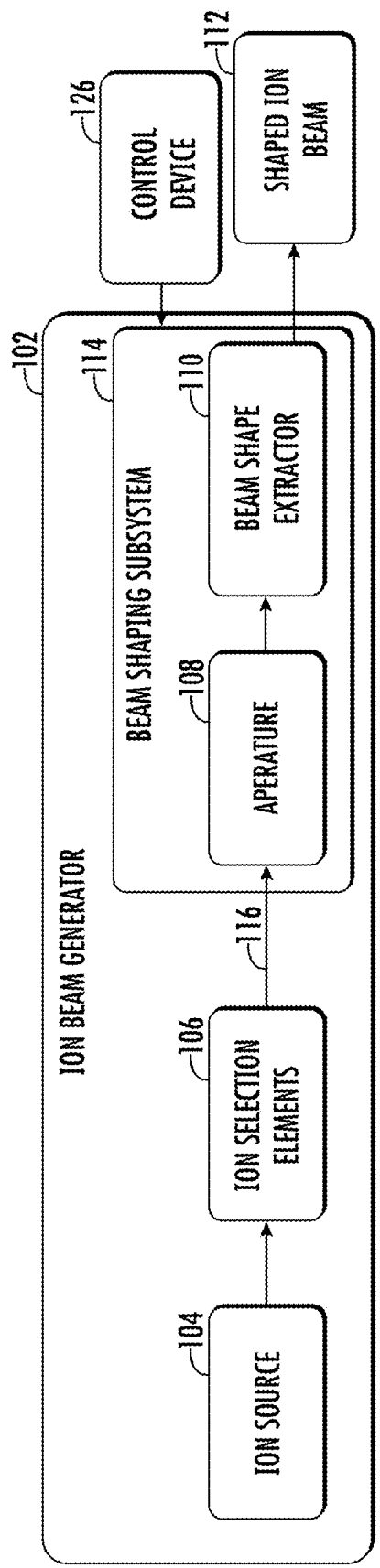
FIG. 1A is a block diagram showing a high-level overview of an exemplary ion beam generator in accordance with one embodiment.

Different ion beam generators produce and shape ion beams in different ways. As a result, the beams produced by different ion beam generators tend to have different shapes. A user of a particular ion beam generator may wish to duplicate the shape produced by a different ion beam generator (for example, because the user had experience with a different ion beam shape, for process matching purposes, etc.). In other cases, a user may wish to experiment with new ion beam shapes to improve process performance.

Beam shape can be described in a number of ways. Some metrics that can be used to define the beam shape include, but are not limited to:

the beam envelope (the width and height where a certain percentage, such as 95%, of the beam is contained);

the vertical and horizontal beam intensity distribution (which may be measured on a fixed spot and/or the net beam where the spot is scanned horizontally)—examples include the full height, half max or "FHHM" value, the beam's mean plus standard deviation, etc.;

the vertical and horizontal beam angle distribution (which may be measured on a fixed spot and/or the net beam where the spot is scanned horizontally)—examples include the vertical within-device angle (vWIDA), the horizontal within-device angle (hWIDA), the mean vWIDA or hWIDA (vWIDAM or hWIDAM), the standard deviation for the vWIDA or hWIDA (vWIDAS or hWIDAS), etc.; and the overall shape variation in intensity or smoothness of the beam, which may be measured as beam quality (how closely the spot beam follows a vertical and horizontal Gaussian cross section), by the identification and location of hot spots (e.g., through a max nearest neighbors, or "MNN," technique.

Other measurements may not directly impact the beam shape, but may be tuned using the techniques described herein. For instance, the vertical/horizontal beam angle mean (BAM) and beam angle standard deviation (BAS) may represent a measure of asymmetry in the beam, which is likely undesirable. Exemplary techniques can be used to manipulate vBAM, vBAS, hBAM, and hBAS in order to minimize or correct these values to create a more symmetrical beam.

Ideally, a user could select a desired ion beam shape from a wide variety of possibilities to tailor the ion beam shape to the particular task being performed. The user might wish to configure a particular spot beam shape to match the net process results of a particular piece of equipment, to manipulate how three-dimensional structures are implanted or etched, and/or to match complex thermal (or other effects) that impact over all device performance, yield, or throughput, among other possibilities. For example, a user may desire a wide but short beam, which may be useful if the user is attempting to impart specific patterns on a wafer and needs a finer "point"—the short height allows the implant to be varied significantly in the vertical direction, while implanting a large number of ions. On the other hand, a narrow and short beam allows the user to control both the horizontal and vertical variation in the beam.

Another consideration may be the current distribution within a spot beam. For example, a tall and narrow shape may be desired to provide vertical overlap (statistical smoothing) and to allow the beam's sweep direction to be reversed more quickly. In some cases, a non-uniform current distribution may be desired. For instance, exemplary techniques could be used to create concentric rings or other non-uniform implants, which may be useful in countering semiconductor processes that impart a counteruniformity (e.g., polishing)

In some embodiments, this may involve configuring the shape of a spot beam (e.g., the horizontal and vertical intensity distribution, horizontal and vertical angle distribution, overall width, height, current, etc). The principles described herein can also be applied to change the configuration of other types of beams (different from spot beams). For example, the techniques described herein can be used to adjust the height of a ribbon beam.

Furthermore, complex interactions may occur if the beam's intensity is too focused or unfocused. The beam may impart heat and damage to the underlying silicon matrix. This effect may be desirable or undesirable, depending on the application.

In order to achieve these effects, a controller that adjusts the generator's beam shaping mechanisms needs to be programmed with an understanding of how adjusting those mechanisms will affect the beam shape. However, the ion beam shape can be altered by adjusting any of a wide variety of different beam shape parameters (e.g., the current used by a quad 3 magnet, an amount of post-scan suppression, a degree of focus, etc.). Each of these parameters can take on a wide range of values, meaning that there are a tremendous number of possible configurations of the ion beam generator. Only a small subset of these configurations may achieve the desired shape while also allowing the shape of the beam to be adjusted. In some configurations, adjusting one of the parameters may cause the beam shape to change unpredictably; in others, adjusting a parameter may have no effect on the beam shape at all.

Any given configuration is testable: the ion beam generator can be set up in the configuration and the resulting beam shape can be measured. However, measuring a configuration takes time. Due to the sheer number of possible configurations, it is impractical to measure all of the possible configurations. Consequently, existing solutions for configuring an ion beam generator in order to achieve desired ion beam shapes tend to be relatively slow and may identify suboptimal configurations.

Exemplary embodiments described herein relate to techniques for identifying configurations of tunable parameters for an ion beam generator that are stable (only a relatively small subset of available tunable parameters need to be changed to adjust the beam shape) while still being sensitive to change (adjusting one of the tunable parameters should cause the beam shape to change in a predictable, preferably linear, way, without changing too quickly or too slowly).

In one embodiment, a system may receive parameters describing a desired shape for an ion beam. The beam shape parameters may define the beam's shape in terms of an angle, angle spread, width, height, intensity, intensity drop off, etc.

The system may further receive tunable parameters for an ion beam generator configured to generate the ion beam. The tunable parameters may represent settings on the ion beam generator that can be adjusted to change the shape of the ion beam. The tunable parameters may be settings for particular sub-components of a beam shaping subsystem of the ion beam generator (e.g., the current applied to a quadropole magnet, the position of a mechanical component that moves an aperture or extraction manipulator, a strength of an electrostatic field or electromagnetic field that the ion beam passes through, a focus voltage, a scanner offset voltage, a post scan suppress voltage, etc.).

By setting these tunable parameters to specific values, an ion beam of a particular shape is generated. A goal of exemplary embodiments is to identify a combination of values for the tunable parameters that can create a desired beam shape.

It should be noted that identifying a single combination of values for the tunable parameters that achieves a specific beam shape may not be ideal. Once the beam shape is achieved, a user may still wish to adjust aspects of the beam shape (e.g., changing the height, width, or angle of the beam while otherwise maintaining its shape). A configuration may achieve the desired shape but may nonetheless be unstable: a change to one of the tunable parameters may cause the beam shape to change erratically. Thus, the remaining (unlocked) tunable parameters should be adjustable and, when adjusted, should change the shape of the ion beam in a predictable, preferably linear way. For example, adjusting one of the unlocked parameters should cause the ion beam to change in width, where the increase or decrease in width varies linearly with the adjustment to the unlocked parameter.

Therefore, it may not be sufficient to identify one specific point in the search space that is stable and sensitive; it may be important to also consider the stability and sensitivity of the region in the search space around the specified point (representing tunable parameter values that would be achieved by changes to the values at the specified point). These nearby combinations are referred to as clusters. If a cluster is both stable and sensitive, then adjusting the values for the unlocked parameters will cause the beam shape to change in a predictable way.

Another goal is to lock the values for as many of the available tunable parameters as possible. These locked values should not be changed as the beam shape is adjusted. This simplifies the adjustment process: the beam shape can be adjusted faster because only a relatively small number of the tunable parameters need to be changed to achieve the desired effect.

Finding a combination of values for the tunable parameters that achieves these goals requires searching through the available combinations to find a workable solution. This needs to be done in a reasonable amount of time, which generally precludes making measurements of all the possible combinations. In exemplary embodiments, this searching can be performed quickly by: (1) performing selective measurements on a relatively small exploratory subsample of combinations in the search space; (2) identifying regions of the search space for further consideration based on the measurements; (3) interpolating beam shapes for unmeasured combinations in the identified regions using a machine learning (ML) regression model; (4) removing uncertainty around relatively low-confidence interpolations by measuring the beam shape for these interpolations; (5) evaluating promising clusters of tunable parameter values; and (6) selecting a cluster that meets the goals outlined above.

Exemplary embodiments can achieve good results relatively quickly, because only a small subset of the possible combinations is measured (the original exploratory subsample, and those interpolated points for which the regression model has the least confidence). The remaining points in the search space are interpolated in a high-speed process that allows many points to be explored with high confidence. For instance, in one test tunable parameters were selected by measuring 625 exploratory points that were then expanded with over 1,000,000 interpolated (simulated) points.

To that end, exemplary embodiments may select a set of exploratory points within a search space. The search space may be an n-dimensional search space, where n is an integer corresponding to the number of tunable parameters. Each point in the search space may represent a possible combination of values for the tunable parameters.

For each of the exploratory points, measured beam shape parameters may be received. The measured beam shape parameters may be generated based on the combination of values for the tunable parameters defined by the respective exploratory point and may represent a measured value for the beam shape parameter using the combination of values for the tunable parameters defined by the exploratory point.

Exemplary embodiments may train a regression model configured provide predicted beam shape parameters for interpolated points in proximity to the exploratory points. Any suitable regression model can be used; for instance, a Gaussian process, gradient boosting, or any other suitable regressor may be used.

In some embodiments, the regression model provides a confidence value for each of the interpolated points. For example, the regression model may identify multiple possible solutions for a given point, and may create a confidence interval (e.g., a 95% confidence interval that encompasses 95% of the predictions). The wider the confidence interval, the less confident the regression model may be in the selected solution. For example, if the confidence interval is +/−0.05 (e.g., encompassing values between 0.95 and 1.05), then the regression model is more confident in this solution than if the confidence interval were +/−0.20 (which would encompass values between 0.8 and 1.2 in the above example). Alternatively or in addition, the regression model might provide a confidence score (e.g., 7.8 or 96%).

Exemplary embodiments may identify that one of the plurality of clusters is associated with a low-confidence interpolated point having a confidence value above or below a predetermined threshold value (e.g., a relatively wide 95% confidence interval, or a relatively low confidence score).

In response to determining that the regression model is not highly confident in the interpolation, exemplary embodiments may cause the beam shape parameters to be measured at the interpolated data point. Measuring the values causes the uncertainty around the interpolated point to drop to zero. The measured values may be fed back into the regression model and used to retrain it, thereby improving the regression model's performance. The retrained regression model can then be re-applied to other low-confidence interpolated points, potentially improving the associated confidence values. Interpolated points that still have low confidence can be measured, and the process can repeat.

Exemplary embodiments may define a plurality of clusters within the search space based on the predicted beam shape parameters and the measured beam shape parameters. These clusters may represent groupings of values for the tunable parameters, such as an area of the search space in a predetermined range of a selected point. In some embodiments, an objective function may be defined that describes how closely the beam shape that results from the combination of parameters at any given point matches the originally supplied beam shape parameters. The objective function may map an input comprising one or more measurements for a beam shape to a score or value that increases the closer the measurements are to the original beam shape parameters. The beam shape parameters may be weighted so that some of them are treated as more important than others; parameters with a higher weight may contribute more to the value output by the objective function than parameters with a lower weight. The clusters may represent areas around the local maximums of the objective function in the search space.

Exemplary embodiments may evaluate the plurality of clusters for at least one of a stability or a sensitivity of the tunable parameters within each respective cluster. In some embodiments, a cluster may be selected, and combinations of values for the tunable parameters within the selected cluster may be identified. For example, a central point in the cluster may be selected for evaluation, or a point in the center of a relatively stable region may be selected. The specific point selected within the cluster may be adjusted in an attempt to better achieve one of the effects on the shape of the ion beam noted below.

A value for a first one of the tunable parameters may be adjusted, and the effect of this adjustment on the shape of the ion beam may be determined. The effect on the shape of the ion beam may be measured in several different ways. In some embodiments, the change in the value of the above-described objective function may be used to determine the effect. In some embodiments, the change in individual beam shape parameters may be considered independently, and values for each of the beam shape parameters may be used as a value representing the effect on the beam shape.

Adjusting the first one of the tunable parameters can have a few possible effects on the shape of the ion beam. In some cases, the beam shape will not change significantly, even when the tunable parameter is changed by a relatively large amount. In this case, it is known that this particular tunable parameter does not have an effect on the beam shape, and therefore it provides no capability to tune the beam shape. This tunable parameter can therefore be safely locked to a particular value in the stable region.

In some cases, the beam shape may change parabolically around the selected point. For instance, the beam shape may increase as the value for the tunable parameter approaches the value at the selected point and may decrease after the value passes the selected point. In this case, it may be possible to lock the tunable parameter to the value achieved at the minimum/maximum of the parabola, which may represent a relatively stable region.

In some cases, changing the value for the tunable parameter may cause the measurement of the beam shape to change erratically, noisily, or otherwise in a non-linear manner. In this case, the current cluster may not be a good candidate for selection. Even if the desired beam shape can be achieved within the cluster, the beam shape may not be adjustable in a predictable way; changing the value of the tunable parameter may alter the beam shape a great deal, or not at all. Accordingly, the cluster may be removed from consideration.

In yet other cases, adjusting the value for the first tunable parameter may cause the value for the beam shape to change in a substantially linear manner. In other words, an adjustment to the value of the tunable parameter may cause a proportional change in the value for the beam shape. This outcome means that the beam shape is stable and sensitive with respect to the first tunable parameter. The tunable parameter may therefore be marked as freely adjustable. The cluster may be scored based on how stable the cluster is (represented, e.g., how many of the tunable parameters have been locked down in the cluster, with clusters having larger number of locked parameters having a higher stability score). The cluster may also be scored based on how sensitive the beam shape is to adjustment of the unlocked parameters in the cluster. A sensitivity score may increase as the response of the beam shape becomes more linear. Furthermore, it may be desirable that the linear response is not too steep or too shallow. If the response is represented by a line having a steep slope, then a small adjustment to the tunable parameter may result in a linear but relatively large adjustment to the beam shape. Similarly, if the slope is too shallow, then it may be necessary to adjust the tunable parameter a great deal before the beam shape reacts in the desired way. Thus, a target slope for the linear response may be defined, and the sensitivity score may be increased as the beam shape response approaches the target slope.

It may also be possible that two or more tunable parameters affect the beam shape in an orthogonal manner. In other words, a first one of the tunable parameters may affect a first aspect of the beam shape (changing a first one of the beam shape parameters in a linear fashion) but may be neutral with respect to a second aspect of the beam shape (where a second one of the beam shape parameters remains stable as the first tunable parameter is adjusted). A second tunable parameter may behave in the opposite manner: adjusting the second tunable parameter may not result in a change to the first beam shape parameter but may change the second beam shape parameter in a linear fashion. By way of example, it may be the case that one of the tunable parameters affects the horizontal angle of the ion beam but not the vertical angle, whereas a second tunable parameter affects the vertical angle but not the horizontal angle.

In this situation, a value for the first tunable parameter may be optimized (e.g., by looking for a value around which the ion beam measurement has good sensitivity to changes in the first tunable parameter) while locking the second tunable parameter at its own value. The value for the first tunable parameter may then be locked and the second tunable parameter may be unlocked. The value for the second tunable parameter may then be optimized. Because of the additional degree of freedom that such a setup provides, a cluster having orthogonal tunable parameters may be preferred over other clusters when the clusters are evaluated.

Exemplary embodiments may select one of the plurality of clusters based on the evaluating. A cluster having the highest scores for stability, sensitivity, and/or a weighted combination of both may be selected.

Exemplary embodiments may output tuning settings for the combination of tunable parameters corresponding to the selected cluster. The tuning settings may identify, for instance, which of the tunable parameters should be locked (and the values at which they should be locked), a starting value for unlocked tunable parameters that achieves a desired beam shape, and an identification of which of the parameters are unlocked and therefore adjustable. Optionally, the tuning settings may provide a range of acceptable values for the unlocked parameters (e.g., if the ion beam shape response becomes unstable or insensitive to the tunable parameters beyond certain values, those values may be identified and the tunable parameter may be prevented from exceeding them).

The ion beam generator may be automatically configured with the tuning settings. In some embodiments, the tuning settings may be stored in a library; when a user wishes to use the specified ion beam shape in the future, the tuning settings for the ion beam shape may be retrieved from the library and applied to the ion beam generator.

As an aid to understanding, a series of examples will first be presented before detailed descriptions of the underlying implementations are described. It is noted that these examples are intended to be illustrative only and that the present invention is not limited to the embodiments shown.

Reference is now made to the drawings, wherein like reference numerals are used to refer to like elements throughout. In the following description, for purposes of explanation, numerous specific details are set forth in order to provide a thorough understanding thereof. However, the novel embodiments can be practiced without these specific details. In other instances, well known structures and devices are shown in block diagram form in order to facilitate a description thereof. The intention is to cover all modifications, equivalents, and alternatives consistent with the claimed subject matter.

In the Figures and the accompanying description, the designations "a" and "b" and "c" (and similar designators) are intended to be variables representing any positive integer. Thus, for example, if an implementation sets a value for a=5, then a complete set of components 122 illustrated as components 122-1 through 122-a may include components 122-1, 122-2, 122-3, 122-4, and 122-5. The embodiments are not limited in this context.

FIG. 1A depicts a high-level overview of an ion beam generator 102 suitable for generating a shaped ion beam 112 according to exemplary embodiments. Examples of ion beam generators 102 include the VIISta® family of ion implanters by Applied Materials, Inc. of Santa Clara, California. Ion beam generators may be used for ion implantation, etching, cleaning surfaces, etc.

The ion beam generator 102 may include an ion source 104. The ion source 104 may generate ions for the ion beam. The ion source 104 may generate ions using any suitable technique (e.g., electron ionization, chemical ionization, plasma, electric discharge, etc.).

The ion source 104 may generate ions of a variety of different types, only some of which are desired for use in the shaped ion beam 112. Accordingly, ion selection elements 106 may be used to filter out undesirable ions while allowing desired ions to pass through into the ion beam. For example, a mass separation magnet may separate out desirable ions based on mass number and valence, or an energy separation magnet may separate out desirable ions based on their energies.

The ion beam 116 may then be provided to a beam shaping subsystem 114. The beam shaping subsystem 114 may include one or more components for adjusting the ion beam 116 into a desired shape. The resulting shaped ion beam 112 may have a number of characteristics that define the shape of the beam. Examples of such characteristics include a vertical or horizontal beam angle distribution, a vertical or horizontal intensity distribution, and horizontal or vertical beam extent (envelope where current is contained).

Figure 1B:
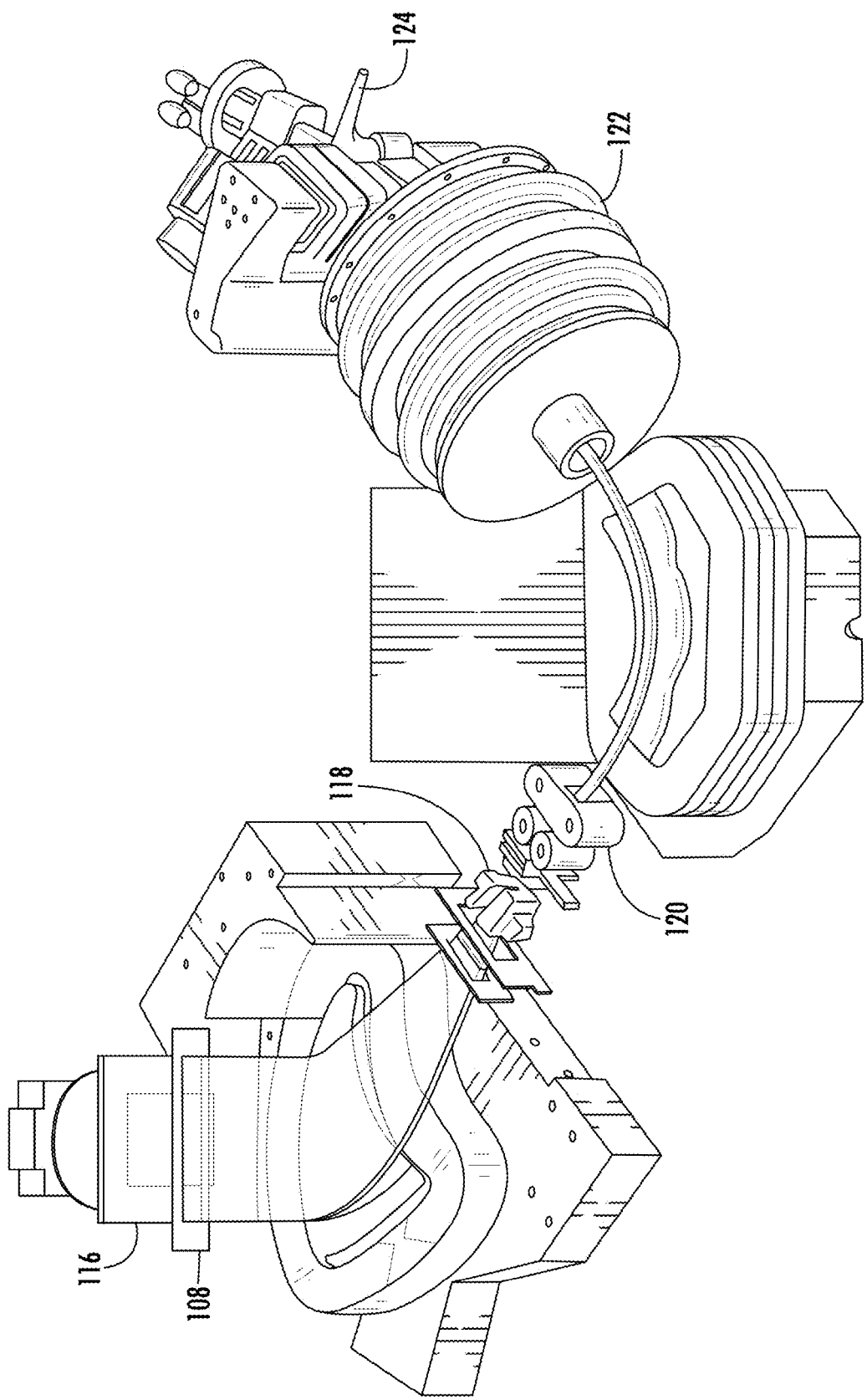
FIG. 1B depicts the beam shaping subsystem of the ion beam generator of FIG. 1A in more detail, in accordance with one embodiment.

The initial shape of the beam may be defined by an aperture 108 through which the beam passes. The size, shape, and position of the aperture 108 may be controlled by mechanical elements. After passing through the aperture 108, the ion beam may be adjusted by a beam shape extractor 110, which may include several components, examples of which are shown in FIG. 1B.

For instance, the beam shaping subsystem 114 may include scan offset controls 118 that change the scan origin of the beam; for example, the scan offset controls can move the beam center inboard or outboard. The effects of changing the scan offset on the beam are shown, for example, in FIG. 1C, where a more negative scan offset is associated with a wider, shorter beam whose center is shifted to the right (in the diagram).

Figure 1C:
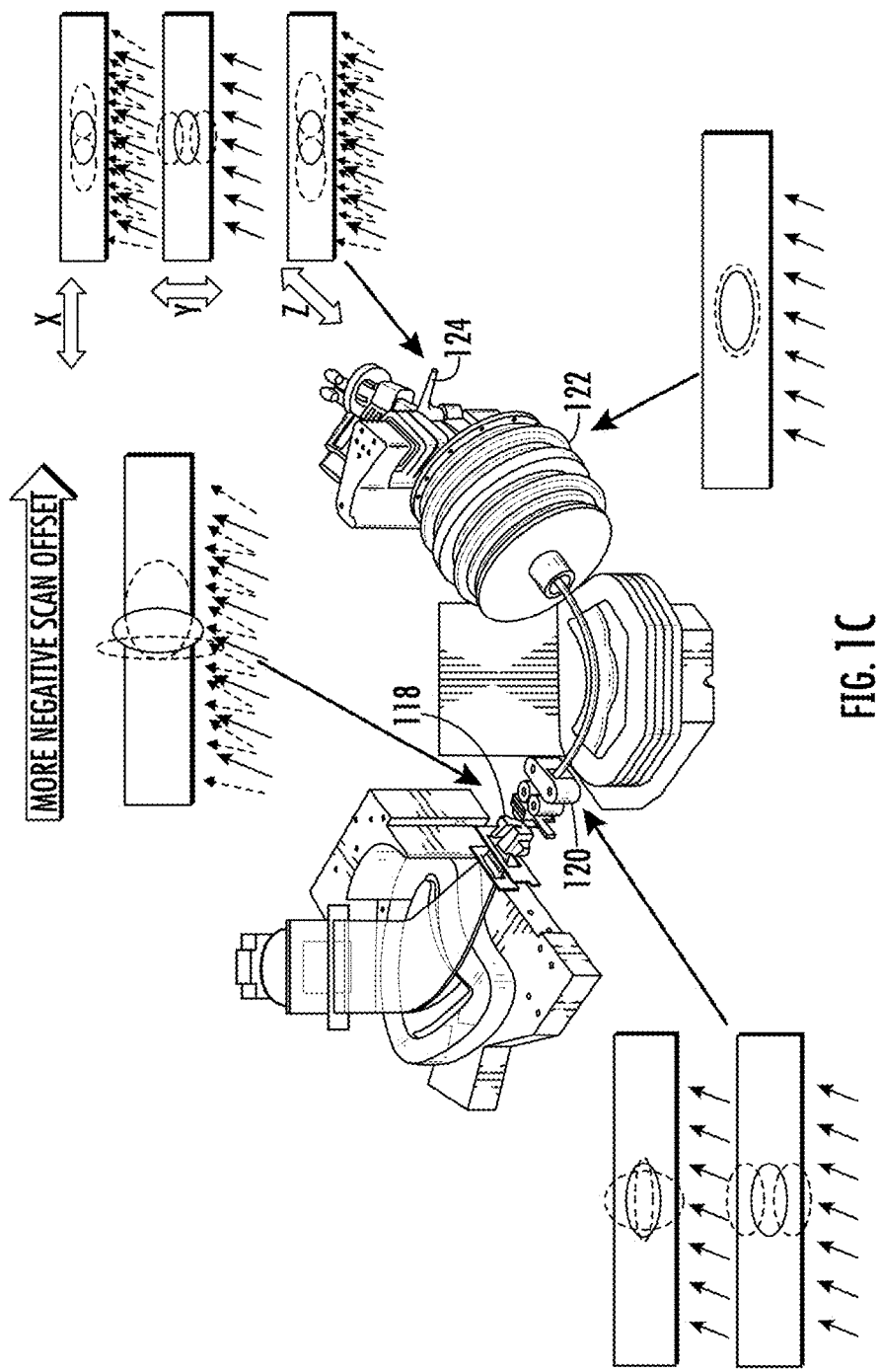
FIG. 1C illustrates how changes to certain components of the beam shaping subsystem of FIG. 1B affect the shape of the ion beam in accordance with one embodiment.

The beam shaping subsystem 114 may further include optical elements 120 configured to adjust the beam through (for example) a magnetic or electrical field. Examples of optical elements 120 include quad 2 and quad 3 magnets. A quad 3 magnet, for example, can be set to a quad mode or a dipole mode. The effects of changing the magnet's mode are shown in FIG. 1C, where the quad mode is used to control the beam height and shape—the beam in this example is associated with red-green-blue (RGB) components that overlap each other in progressively taller but skinnier shapes. The dipole mode is generally used to steer the beam up and down—in FIG. 1C, the dipole mode is associated with RGB components of similar size and shape that are more spread out. Optical elements 120 are often used to adjust the beam height and shape, various aspects of the beam's vertical angle (vertical within device angle, or "vWIDA," vertical beam angle mean, or "VBAM," vertical beam angle spread, or "VBAS"), and beam transmission characteristics such as downstream clipping.

The terms "vWIDA" and "hWIDA" generally refer to the spread of vertical and horizontal angles often used to implant the sides of three-dimensional wafer structures. By way of example, consider a cube extending from the surface of a wafer. The cube has a top and four sides, and the wafer surface may be relatively flat and may extend in the same plane as the cube top. If the implanter beam extends straight down (with no vWIDA or hWIDA), then only the top of the cube and the wafer surface may be implanted—the sides of the cube do not receive any ions. If the beam is imparted with a vertical angle distribution (vWIDA), however, then one or two of the sides of the cube (into which the vertical distribution is directed) may receive ions. By also adjusting the hWIDA, the other sides of the cube may also receive ions.

The beam shaping subsystem 114 may further include a focus 122. The focus 122 may be used to adjust the tightness of the beam; for example, the focus 122 is often used to adjust the beam's width and height, and beam transmission characteristics. The effects of changing the focus 122 are shown in FIG. 1C.

The beam shaping subsystem 114 may further include an axis manipulator 124 configured to change aspects of the X-, Y-, and/or Z-axes of the beam. The effects of changing these aspects are shown in FIG. 1C. For instance, the X-axis manipulator may change the center position and horizontal beam angle mean of the beam. The Y-axis manipulator may change the beam's vertical position, beam transmission, and vertical angle. The Z-axis manipulator may change the beam's half width, beam focus, scan origin, center position, and beam angle mean.

It is noted that the specific components shown in FIG. 1B and the effects shown in FIG. 1C are provided for illustration purposes only. An ion beam generator 102 may include more, fewer, or different shaping elements, in different orders and different combinations. A given shaping element may have a different effect on the ion beam than the one shown in FIG. 1C. The elements used and their effects will depend on the particular ion beam generator 102 and its intended applications.

Returning to FIG. 1A, any or all of the elements of the beam shaping subsystem 114 may be adjustable by changing one or more settings of the components of the beam shaping subsystem 114. These settings, which can also serve as tunable parameters as described below, include (but are not limited to), the positioning of the mechanical elements that control the aperture 108, an amount of focus, a magnet current, an amount of force applied to a force-driven optical element, an electrostatic optical element current, a post scan suppression, a scanner offset, a source life, or a cell suppression, etc. These settings may be adjusted by a control device 126, which may be a computing system interfaced with the ion beam generator 102, or a controller on the ion beam generator 102 itself.

As can be seen from the discussion above, each of the elements of the beam shaping subsystem 114 may be associated with one or more tunable parameters than can be changed to affect the beam's shape, which may itself be measured using multiple different beam shape parameters. Identifying which combinations of tunable parameters affect the beam shape parameters, and in what way, is a daunting task.

Currently, this is achieved by limiting the number of tunable parameters under consideration (e.g., to two at a time), actually measuring the effect of changes to these tunable parameters on the beam shape, and visualizing the results so that a user can manually identify a solution. However, this approach suffers from several problems. First, by limiting the number of tunable parameters under consideration, these solutions may overlook solutions that might be better or more tunable because some parameters are not considered. Furthermore, since parameters are generally only considered two at a time, these solutions may miss interactions between some of the parameters that are not considered in combination with each other. Still further, performing the measurements takes time, and visualizing the measurements and waiting for a manual input take still more. Because of the amount of time required, only a relatively small number of options can be considered.

As alluded to above, exemplary embodiments address these problems with an efficient searching strategy that is capable of searching a high-dimensional search space quickly. This allows more tunable parameters to be considered in combination, resulting in better solutions, while arriving at those solutions in a reasonable amount of time.

Figure 2:
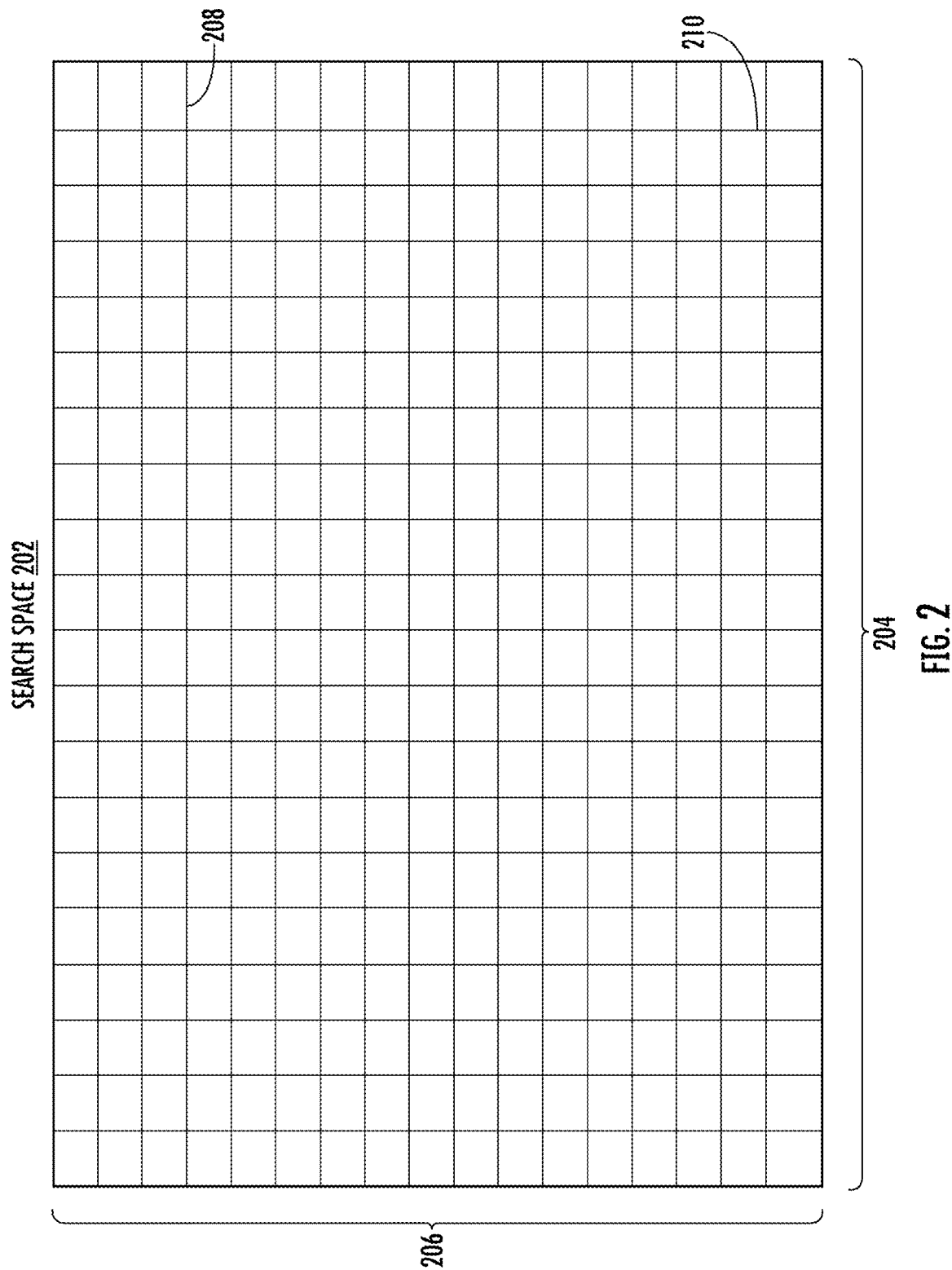
FIG. 2 depicts a simplified example of a two-dimensional search space in accordance with one embodiment.

FIG. 2 depicts a simplified example of a search space 202. The search space 202 of FIG. 2 is a two-dimensional search space for ease of illustration, but in practice the search space 202 may be an n-dimensional search space (where n is an integer corresponding to the number of tunable parameters available). Each axis of the search space 202 may correspond to different values for one of the tunable parameters; for example, the search space 202 includes a first axis of first parameter values first parameter values 204 and a second axis of second parameter values 206.

Each point in the search space corresponds to a particular combination of values for the tunable parameters. For example, FIG. 2 highlights a first potential solution 208, where the first parameter value 204 is relatively high (e.g., "19") and the second parameter value 206 is also relatively high (e.g., "15"). This might correspond to a point designated by the tuple (19, 15). At a second point in the search space corresponding to a second potential solution 210, the first parameter value 204 is relatively high (e.g., "19"), while the second parameter value 206 is relatively low (e.g., "1"). This might correspond to a point designated by the tuple (19, 1). A higher-dimensionality space might be defined by points having higher dimensionality—an example of a value for a point in a 5-dimensional space might be (19, 15, 6, 22, 5). Obviously, as more dimensions are added, the number of possible combinations and therefore the size of the search space 202 increases exponentially.

At each point in the search space 202, the combination of values for the tunable parameters correspond to settings of an ion beam generator that would give rise to a particular beam shape. The beam shape might be close to the desired beam shape sought by a user or might not be particularly close. To evaluate how well the beam shape at a particular point matches the desired beam shape, an objective function may be defined. The objective function may be, for example, a figure of merit ("FOM").

The objective function may accept, as an input, a set of measured beam shape parameters that have been measured after the ion beam generator is configured based on the tunable parameters at a particular point. The objective function may map the measured beam shape parameters to a value that represents how closely the beam shape defined by the measured beam shape parameters matches the desired beam shape. As the measured beam shape approaches the desired beam shape, the output of the objective function may increase. Each of the beam shape parameters may be associated with a weight in the mapping, allowing some of the beam shape parameters to take precedence over others.

For example, if the beam shape parameters under consideration are the vertical within device angle mean ("vWIDAM") and the vertical within device angle spread ("vWIDAS"), the objective function might be:

$$\text{Figure of Merit(FOM)} = f(v\text{WIDAM}, v\text{WIDAS}) \quad \text{Equation 1}$$

The objective function can be calculated for any of the points in the search space by configuring the ion beam generator based on the combination of values for the tunable parameters defined at the point, generating a shaped ion beam, and then measuring characteristics of the shaped ion beam using a metrological device. For example, the beam may be provided to a multipixel profiler to measure the beam's dose, beam height (Y-extent, Y-sigma, and full height half max, or "FHHM"), beam shape (vertical intensity), beam hot spot (MNN), and shadows H angles. The beam may be provided to a 7 cup XPVPS to measure the beam's vertical angles (VBAS, VBAM), the standard deviation of each vertical angle (vWIDA), the average of vWIDAs (vWIDA Mean), and the standard deviation of vWIDAs (vWIDA Sigma).

The results of the measurements may be provided to the objective function, which compares the measured beam shape against the desired beam shape (with the mappings weighted based on the weights assigned to each beam shape parameter) and outputs a value. The higher the value, the more closely the generated beam matched the desired beam shape.

Figure 3:
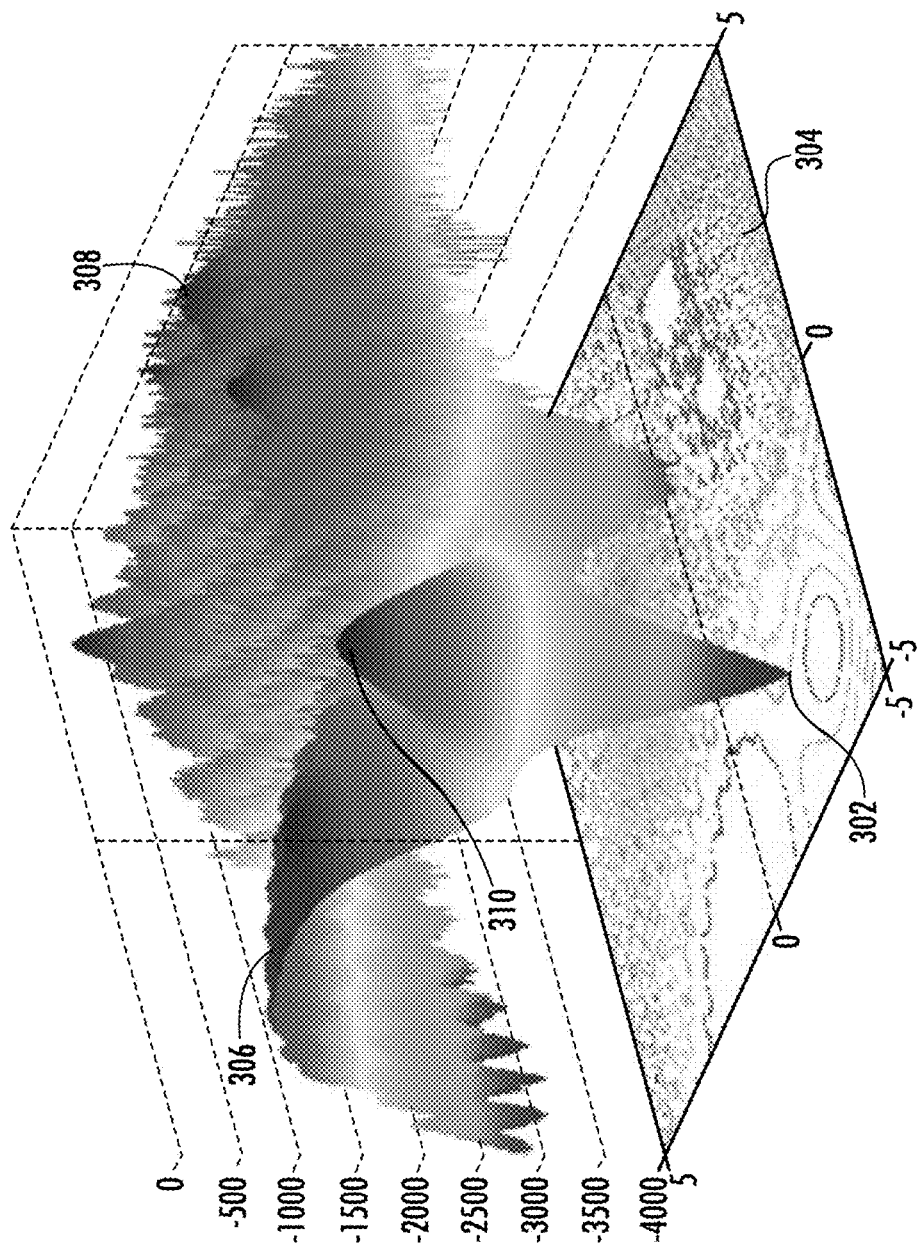
FIG. 3 depicts the value of an objective function at various points in the search space in accordance with one embodiment.

FIG. 3 depicts an example of the values for the objective function (along the Z-axis) mapped against the points in the search space (along the X- and Y-axes). As can be seen, there are valleys 302 in some areas where the objective function outputs a low value (where the measured beam shape does not match the target beam shape very well). There are peaks in areas where the objective function outputs a high value (where the measured beam shape does match closely to the target beam shape). The output of the objective function is shown here as a three-dimensional mapping that is color-coded based on the value of the objective function at each point. The output of the objective function can also be projected into a two-dimensional heat map 304 for review.

FIG. 3 depicts the three-dimensional representation of the objective function measured in a two-dimensional search space for ease of illustration. In practice, exemplary embodiments can be used with two-dimensional search spaces, but are also capable of operating at higher dimensionality.

As noted above, one goal of identifying a combination of tunable parameters is to make the beam shape match the desired beam shape as closely as possible. Accordingly, one goal is to search the search space for points at which the objective function is at a local maximum (e.g., the peaks in FIG. 3).

However, not all peaks are equally desirable from a tuning perspective. Although a given peak might produce the desired beam shape, it may suffer from deficiencies that make it unsuitable for tuning purposes.

For example, FIG. 3 includes a highly stable solution 306 in which the region surrounding the peak is a relatively flat plateau. Although such a solution will create the desired beam shape, the fact that the value output by the objective function remains high in the areas surrounding the highly stable solution 306 means that the highly stable solution 306 cannot be adjusted to change the shape of the beam. Thus, if a user wished to (e.g.) widen the beam, changing the tuning parameters using the highly stable solution 306 as a starting point would not result in much change to the beam width.

FIG. 3 also depicts a highly unstable solution 308. In the region around the highly unstable solution 308, the output of the objective function varies non-linearly with a change in the values of the tunable parameters (as indicated by the highly volatile nature of the three-dimensional representation in this region). Thus, if a user were to set the ion beam generator into the highly unstable solution 308 and then adjust one of the tunable parameters, the resulting shape of the ion beam would be unpredictable and could vary widely as the parameter is changed.

A more desirable solution is the ideal solution 310. In the region around the ideal solution 310, the output of the objective function does vary, meaning that the shape of the beam does change in response to a change in the value of the tunable parameter. Moreover, the change is smooth and linear—changing the value of the parameter changes the shape of the beam in a predictable and proportional way.

In this example, only two tunable parameters were used, and it is relatively easy to identify a sensitive solution by looking at the graph of the objective function. In practice, when more tunable parameters can be adjusted, the parameters may interact with each other and it may become more difficult to identify a sensitive solution. Thus, another consideration is the stability of the solution. In this regard, it is desirable for some (but not all) of the parameters to be highly stable, so that a change in these parameters does not affect the beam shape. These parameters can be locked to a stable value and the remaining parameters can be evaluated for sensitivity. This effectively reduces the dimensionality of the problem and allows the user to change the beam shape by adjusting a relatively small number of the tunable parameters.

Accordingly, when evaluating a potential solution, both the sensitivity of the solution and its stability may be considered. Highly unstable solutions may be eliminated from consideration as not appropriate, while too-stable solutions may also be eliminated.

Figure 4A:
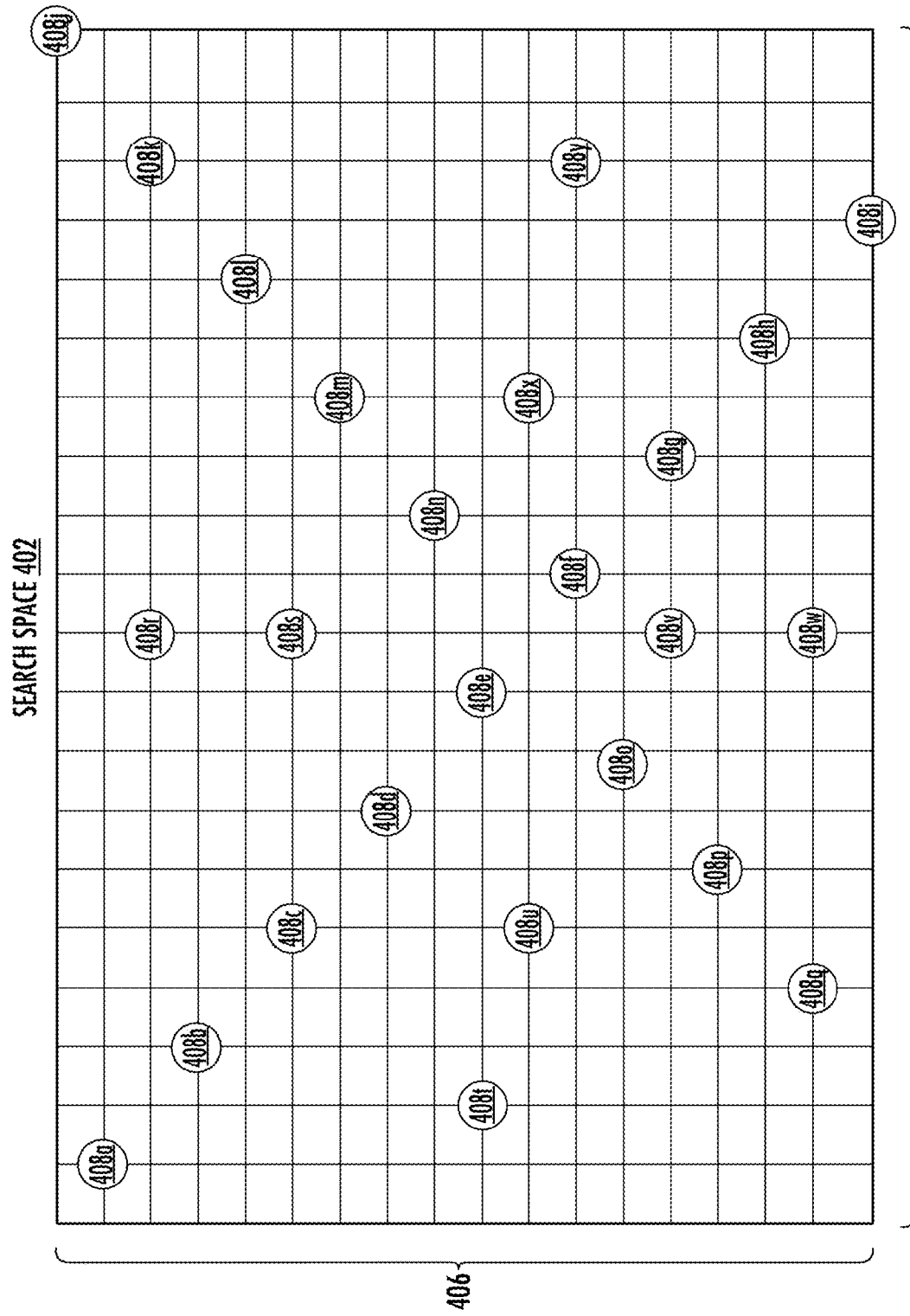
FIG. 4A depicts an example of measured exploratory values for the objective function in the search space in accordance with one embodiment.
Figure 4C:
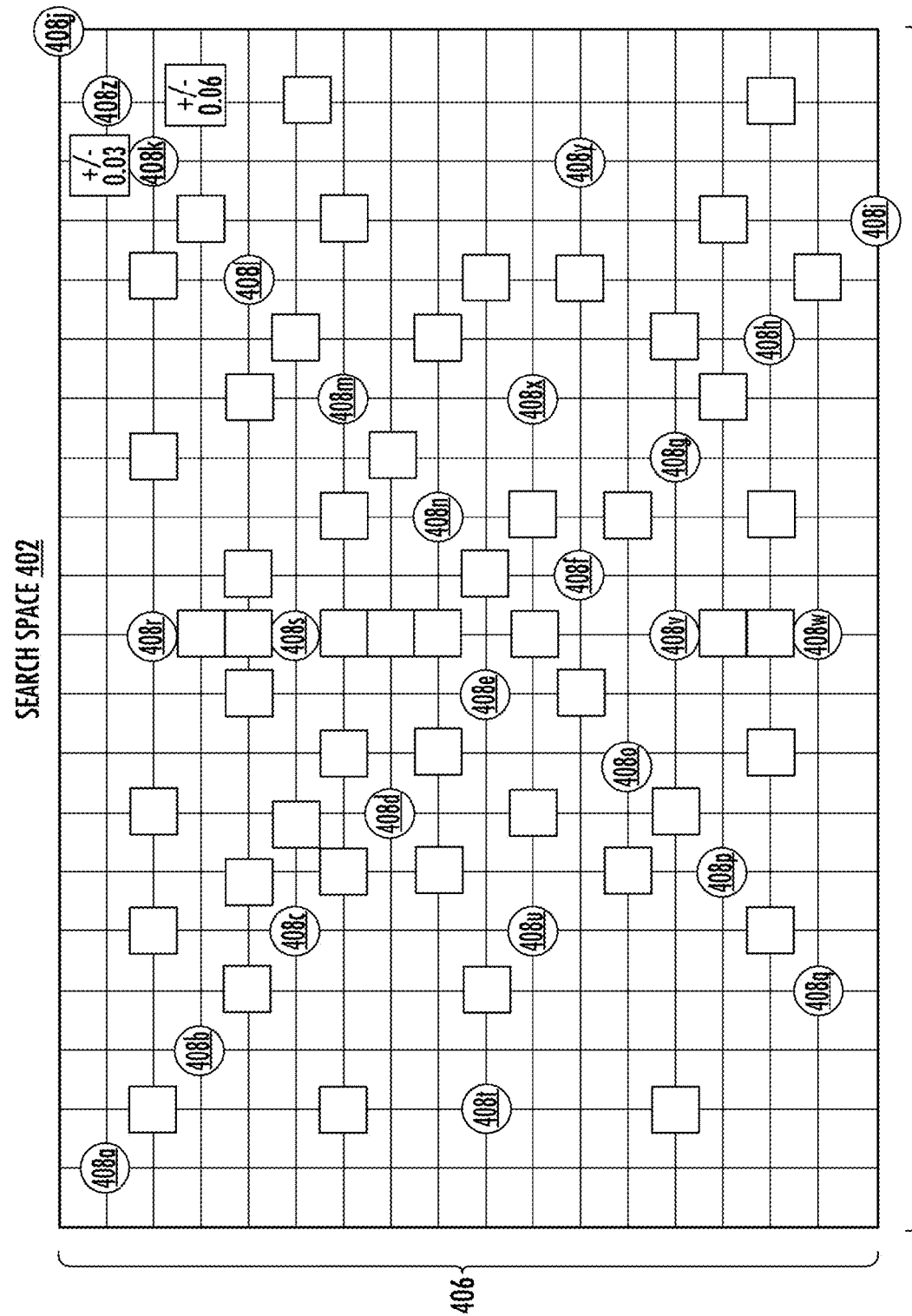
FIG. 4C depicts an example of measuring an interpolated point with a low confidence value in accordance with one embodiment.

The output from the objective function can be obtained by measuring the beam shape parameters at the various points in the search space. However, in practice the number of possible combinations is simply too great to perform these measurements in a timely manner. Accordingly, exemplary embodiments estimate the value for the objective function at non-measured points in order to gain better insight into the behavior of the objective function over the search space. FIG. 4A-FIG. 4C show an illustrative example of how this is done.

As before, this example includes a simplified search space 402 with a first axis defined by first parameter values 404 and a second axis defined by second parameter values 406. Within the search space 402, a number of exploratory points are defined and measured; these points become measured solutions 408a, 408b, . . . 408y.

As noted above, it takes a certain amount of time to perform a measurement. The number of measured solutions 408a, 408b, . . . 408y that are used may be selected based on an available time budget for finding a solution. Alternatively or in addition, the number of searched points may be selected so as to obtain good coverage over the possible values for the tunable parameters.

For instance, the number n of exploratory points may be represented as a value $n=a^{num\_params}$, where num_params is an integer representing the number of tunable parameters under consideration and a is a number of points to be sampled for each parameter. The value of num_params will generally be provided as part of the definition of the problem, and a may be selected based on the available time budget. For example, given the time budget available, it may be determined that no more than 800 points may be measured (thus, the maximum acceptable value for n is 800). The value of a may then be calculated as $floor(n^{1/num\_params})$, or 5 in this example. Thus, it may be known that five points can be sampled per tunable parameter in this example within the time budget (yielding a total of 625 measurements). Preferably, the number of measurements for the exploratory points will be less than the maximum number of measurements that can be performed within the time budget, in order to leave time to measure low-confidence interpolated points as described below.

Once the number of measurable values for the tunable parameters are determined, the system determines which parameter values to perform measurements on. This may be achieved by sweeping the ion beam generators parameters to find acceptable exploration zones. For instance, the different components of the beam shaping subsystem may be adjustable only within a certain range of values (e.g., the aperture can be moved between a first point representing a minimum value and a final point representing a maximum value). The number of available measurements for the parameter may be distributed throughout this range so as to provide good coverage (e.g., one measurement near the minimum, one near the maximum, one near the center, one between the minimum and the center, and one between the center and the maximum). This process may be repeated for each of the available tunable parameters, and these values may be combined together to yield n combinations of values for the tunable parameters. These n combinations may then be measured to yield the measured solutions 408a, 408b, . . . 408y.

As noted above, an objective function may be defined that maps the measured solutions 408a, 408b, . . . 408y to a value or score. Each of the exploratory points may be assigned this value or score based on the output of the objective function. Although many exploratory points can be generated in this way, it still represents only a small sample of the points in the search space 402.

To supplement the exploratory points, exemplary embodiments perform an interpolation process as shown in FIG. 4B. In this example, the squares represent interpolated points. At each of the interpolated points, a machine learning regression model estimates the value of the objective function. The regression model may be trained using the exploratory points to identify a relationship between the tunable parameter values at those points and the corresponding output of the objective function. Examples of regression models include Gaussian processes, boosted trees, etc.

The regression model may provide a predetermined number of interpolations spaced around the exploratory points. For example, in one test, over 1,000,000 interpolated points were generated from 625 measured exploratory points. Once trained, the regression model can perform a simple lookup using a set of values for the tunable parameters and determine the estimated value for the objective function. This can be performed much faster than an actual measurement, allowing many interpolated points to be generated.

The regression model optionally provides a measure of confidence indicating how good an estimate the regressor believes the interpolation to be. For example, the regression model might provide a numerical value representing a score or confidence percentage or might provide a confidence interval (a range of values into which a predefined percentage of the regressors estimates for the value fell). By way of illustration, a Gaussian process calculates a probability distribution over all admissible functions that fit the data. A Gaussian process therefore acts as a data fitter, where multiple different possible solutions go through each measured data point. At the measured data points, the uncertainty of the Gaussian process is zero, but outside the measured data points the different possible solutions diverge based on a statistical distribution. The range of values for the possible solutions may define the uncertainty at unmeasured points.

By way of example, FIG. 4B shows a first interpolated point 410 whose value has been estimated to within +/−0.05. This may mean (e.g.) that the regression model calculated an interpolated value IV for the first interpolated point 410 and defined the range of values for possible solutions. A predetermined amount (e.g., 95%) of the solutions were found to fit within the confidence interval (e.g., 95% of the possible solutions fell between IV−0.05 and IV+0.05).

The regression model is more confident in this value than in the value at a second interpolated point 412, where the range of uncertainty was +/−0.2. Because the second interpolated point 412 is associated with a relatively low confidence value, it is considered a low-confidence interpolated point. As can be seen in FIG. 4B, in the region around the second interpolated point 412, the confidence is also relatively low (+/−0.17 and +/−0.22). This indicates that this region would be a good candidate for measurement, which would reduce the uncertainty in the region as shown in FIG. 4C.

In this example, the second interpolated point 412 has been sent to the ion beam generator for measurement. As a result, the second interpolated point 412 has been converted to a measured solution 408z. The regression model may optionally be retrained using this new information; this retraining may be particularly beneficial because it improves the prediction capabilities of the regression model precisely in a location that the regression model's predictions were highly uncertain. The retrained regression model may be reapplied to re-interpolate some or all of the interpolated points. In some embodiments, the retrained regression model may re-interpolate only those points that were previously associated with a relatively low confidence score (e.g., below a predetermined minimum threshold value, or with an estimated range above a particular size).

As can be seen in FIG. 4C, the uncertainty at the measured solution 408z has been reduced to zero, and the uncertainty in the nearby region has also been reduced (i.e., the nearby interpolated points are now associated with ranges of +/−0.03 and +/−0.06).

Figure 5:
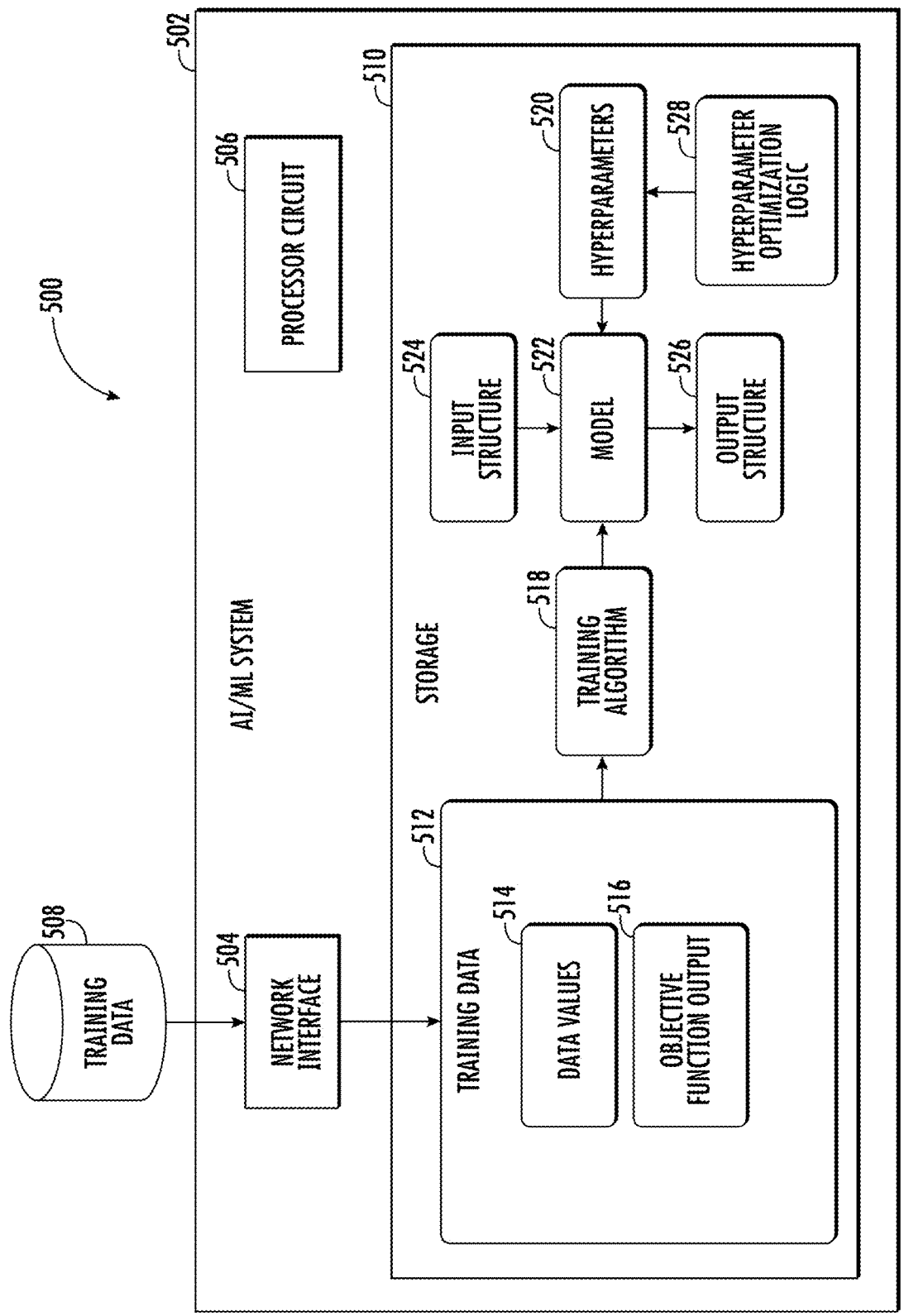
FIG. 5 illustrates an exemplary artificial intelligence/machine learning (AI/ML) system suitable for use with exemplary embodiments.

As noted above, exemplary embodiments may make use of artificial intelligence/machine learning (AI/ML) in the form of a regression model. FIG. 5 depicts an AI/ML environment 500 suitable for use with exemplary embodiments.

At the outset it is noted that FIG. 5 depicts a particular AI/ML environment 500 and is discussed in connection with particular types of regression models. However, other AI/ML systems also exist, and one of ordinary skill in the art will recognize that AI/ML environments other than the one depicted may be implemented using any suitable technology.

The AI/ML environment 500 may include an AI/ML System 502, such as a computing device that applies an AI/ML model 522 to learn relationships between combinations of values for tunable parameters and an output of an objective function comparing the beam shape associated with the combination to a desired or target beam shape. The AI/ML System 502 may include a processor circuit 506

The AI/ML System 502 may make use of training data 508. The training data 508 may be used by the regression model to learn the above-described relationships. According to exemplary embodiment, the training data 508 may be measured data from the exploratory points and/or any low-confidence interpolated points that are measured. The training data 508 may include, for example, data values 514 representing combinations of tunable parameter values and objective function output 516 representing a value output by the objective function based on the data values 514.

The AI/ML System 502 may include a Storage 510, which may include a hard drive, solid state storage, and/or random access memory. In some cases, the training data 508 may be stored remotely from the AI/ML System 502 in databases, libraries, repositories, etc. And may be accessed via a network interface 504. The training data 508 may also or alternatively be training data 512 collocated with the AI/ML System 502 (e.g., stored in a storage 510 of the AI/ML System 502), or may be a combination of local and remote data.

The Training data 512 may be applied to train a model 522. Depending on the particular application, different types of models 522 may be suitable for use. For instance, a Gaussian process may be particularly well-suited to learning associations the data values 514 and the objective function output 516. A particular benefit of Gaussian processes is that they generate confidence intervals as part of the prediction process, thus allowing the system to easily re-evaluate low-confidence interpolated points as described herein.

Other types of models 522, or non-model-based systems, may also be well-suited to the tasks described herein, depending on the designer's goals, the resources available, the amount of input data available, etc.

Any suitable Training algorithm 518 may be used to train the model 522. Nonetheless, the example depicted in FIG. 5 may be particularly well-suited to a supervised training algorithm. For a supervised training algorithm, the AI/ML System 502 may apply the data values 514 as input data, to which the resulting objective function output 516 may be mapped to learn associations between the inputs and the labels. In this case, the objective function output 516 may be used as a label for the data values 514.

The training algorithm 518 may be applied using a processor circuit 506, which may include suitable hardware processing resources that operate on the logic and structures in the storage 510. The training algorithm 518 and/or the development of the trained model 522 may be at least partially dependent on model hyperparameters 520. For instance, a Gaussian process may make use of a Gaussian kernel function that estimates the similarity between two points. The kernel function is associated with multiple parameters that can be adjusted to affect how well and how quickly the model 522 learns the associations.

In exemplary embodiments, the model hyperparameters 520 may be automatically selected based on hyperparameter optimization logic 528, which may include any known hyperparameter optimization techniques as appropriate to the model 522 selected and the training algorithm 518 to be used. For example, exemplary embodiments employing Gaussian processes may make use of cross-validation, Bayesian, gradient-descent, quasi-Newton, or Monte-Carlo techniques.

Optionally, the model 522 may be re-trained over time. For example, as new measured data values are collected (e.g., when a low-confidence interpolated point is measured), the new measured values may be provided to the training algorithm 518 to update the model 522.

In some embodiments, some of the training data 512 may be used to initially train the model 522, and some may be held back as a validation subset. The portion of the training data 512 not including the validation subset may be used to train the model 522, whereas the validation subset may be held back and used to test the trained model 522 to verify that the model 522 is able to generalize its predictions to new data.

Once the model 522 is trained, it may be applied (by the processor circuit 506) to new input data. The new input data may include combinations of values for tunable parameters that have not yet been measured. This input to the model 522 may be formatted according to a predefined input structure 524 mirroring the way that the training data 512 was provided to the model 522. The model 522 may generate an output structure 526 which may be, for example, a prediction of an objective function output 516 to be applied to the unlabeled input.

The above description pertains to a particular kind of AI/ML System 502, which applies supervised learning techniques given available training data with input/result pairs. However, the present invention is not limited to use with a specific AI/ML paradigm, and other types of AI/ML techniques may be used.

Figure 6A:
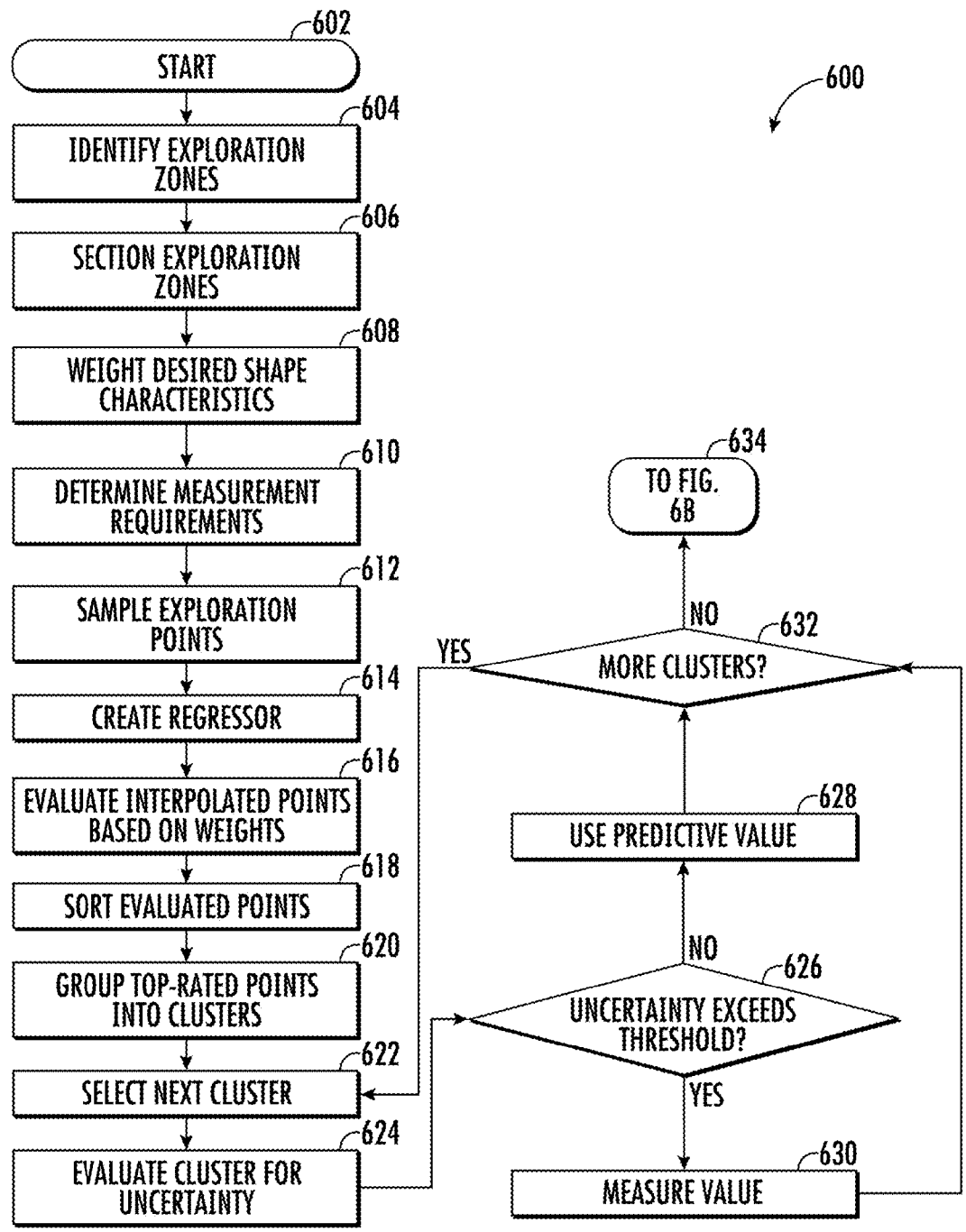
FIG. 6A is a flowchart depicting exemplary logic for identifying a configuration for tunable parameters according to an exemplary embodiment.
Figure 6B:
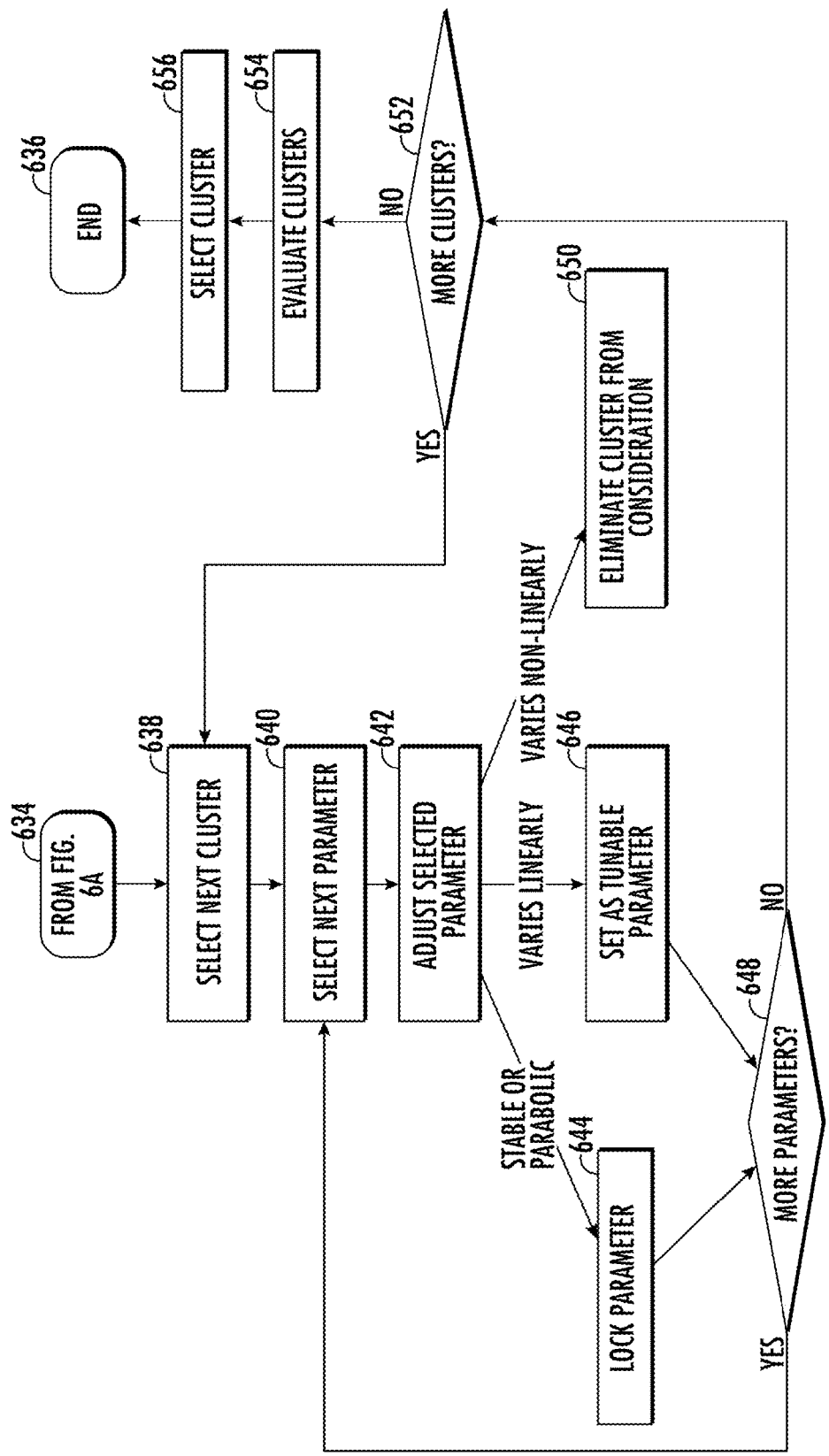
FIG. 6B is a flowchart depicting exemplary logic for identifying a configuration for tunable parameters according to an exemplary embodiment.

FIG. 6A and FIG. 6B are flowcharts depicting exemplary tunable parameter identification logic 600 for identifying configurations of tunable parameters that are stable (only a relatively small subset of available tunable parameters need to be changed to adjust the beam shape) while still being sensitive to change (adjusting one of the tunable parameters should cause the beam shape to change in a predictable and linear way). The tunable parameter identification logic 600 may be embodied as a computer-implemented method, and/or as instructions stored on a computer-readable medium configured to be executed by a processor. The logic may be implemented by a suitable computing system configured to perform the actions described below.

Processing may begin at start block 602. Start block 602 may be initiated when the system receives an instruction to identify a configuration for a given ion beam generator that achieves a specified beam shape as measured by beam shape parameters. The beam shape parameters may be specified explicitly (e.g., a user may define a problem based on target values for specified beam shape parameters) or implicitly (e.g., a user may define a desired shape and general characteristics of the ion beam, and the system may automatically determine which combination of beam shape parameters are required to achieve the desired shape or characteristics).

The instruction may identify the tunable parameters that are available to be adjusted, which may include all or a subset of the tunable parameters available on the ion beam generator. In some embodiments, the tunable parameters may be identified automatically based on a type of ion beam generator under consideration.

At block 604, the system may identify exploration zones for the tunable parameters. The exploration zones may represent ranges of values that the tunable parameters can take on. In some embodiments, the exploration zones may be predefined and stored in a database. In others, the system may be capable of querying the ion beam generator for the exploration zones. In yet others, the system may determine the exploration zones by instructing the subcomponent associated with the tunable parameter to be adjusted and determining when the tunable parameter reaches a minimum or a maximum based on an output of the ion beam generator.

At block 606, the system may section the exploration zones in order to select a number of values for each of the tunable parameters. Preferably, the exploration zones may be sectioned so as to provide good coverage over the entire range of available values for the tunable parameter associated with the exploration zone. As described above, sectioning the exploration zones may be performed based on a time budget and the number of tunable parameters under consideration. The values for each of the tunable parameters may be combined together to create a number of combinations representing exploratory points in a search space.

At block 608, the system may assign weights to the desired shape characteristics (i.e., the beam shape parameters received at start block 602). The weights may be user-specified based on which characteristics of the beam shape are most important to the user or may be automatically generated. For instance, it may be the case that a specified beam shape can be achieved in a number of different ways, but that certain beam shape parameters are required (or are used more heavily to achieve the desired beam shape than others). In this case, the system may automatically assign a weight that increases the importance of the more crucial parameters.

After the beam shape parameters are weighted, an objective function may be defined that maps a beam shape to a score or value that represents how well the beam shape matches the weighted beam shape parameters. An example of an objective function is a figure of merit (FOM).

At block 610, the system may determine measurement requirements for measuring the beam shape. As previously noted, a limiting factor that determines how extensively the search space can be explored is the amount of time required to perform a measurement. However, it may not be necessary to measure every characteristic of the beam. If the desired beam shape parameters provided at start block 602 allow certain measurements to be eliminated (e.g., if the desired beam shape is mostly dependent on horizontal angle measurements and not vertical angle measurements, it may be possible to refrain from performing some of the vertical angle measurements, thereby reducing the amount of time required to perform each measurement and allowing more measurements to be performed.

The exploratory points defined in block 606 may be sampled at block 612. For example, the system may access a particular exploratory point, read the associated values for the tunable parameters, and configure the ion beam generator based on the values. The ion beam generator may then generate a shaped ion beam using the configuration, and one or more metrology devices may measure characteristics of the shaped ion beam. These measurements may be applied to the objective function to determine a value for the objective function at the exploratory point.

After each of the exploratory points is sampled, at block 614 a regressor may be trained. For example, the system may use the outputs of the objective function based on the measured values as training data to train a Gaussian process (or other regression model). The regression model may be applied to generate a predetermined number of interpolated points as described above.

At block 616, the system may evaluate the interpolated points based on the weights received at block 608. For example, the estimated output of the objective function may be recomputed based on expected contributions of the tunable parameters as defined by the interpolated point to the beam shape parameters.

At block 618, the system may sort the evaluated points based on the value of the weighted objective function for each point. At block 620, the highest rated points may be sorted into clusters. Each of the clusters may represent a different local optimum which may achieve the desired beam shape. The system may identify clusters based on image processing or similar techniques for identifying similar groupings or patterns.

At block 622, the system may select the next (or first) cluster as defined in block 620 for consideration. At block 624, the cluster may be evaluated for uncertainty. For example, the local optimum associated with the cluster may be selected, and the uncertainty of the local optimum may be identified. If the local optimum represents a measured point, then the uncertainty may be at or near zero. However, given that there will be many more interpolated points than measured points, it is more likely that the local optimum will fall on an interpolated point. The regression model may output the uncertainty value when calculating the interpolated point, as described above. This uncertainty value may be used as the estimate of the uncertainty for the cluster. In some embodiments, multiple uncertainty measurements from points within the cluster may be combined (e.g., averaged) to determine an uncertainty for the cluster.

At decision block 626, the system determines if the uncertainty for the cluster exceeds a predetermined threshold. For example, the predetermined threshold may be a minimum confidence score or percentage or may be a size of a range of values for a confidence interval. If the decision at decision block 626 is "yes" (the uncertainty is relatively high), then processing may proceed to block 630 and the beam shape for the interpolated point may be measured in the same manner as were the exploratory points described above.

In some embodiments, the system sorts the clusters based on their uncertainty and selects a predetermined number of the lowest-confidence clusters for measurement.

The measured point may be used to retrain the regression model. In some embodiments, the system may wait to batch multiple different measurements and use the batch of measurements to retrain the model. Processing may then proceed to decision block 632.

If the decision at decision block 626 is "no" (the uncertainty is relatively low), then at block 626 the system may determine to use the predicted value for the cluster. Processing may then proceed to decision block 632.

At decision block 632, the system determines if more clusters remain for evaluation. If so, processing returns to block 622 and the next cluster is selected for consideration. If not, processing proceeds to block 634.

From block 634 (FIG. 6B), processing proceeds to block 638 and the clusters are again considered one-at-a time. At this stage, all the clusters should be relatively high-confidence clusters.

At block 640, the system selects one of the tunable parameters associated with the cluster (e.g., the parameter value assigned at the local optimum of the cluster). At block 642, the parameter may be adjusted to observe the parameter's effects on the beam shape.

For this purpose, the system may again make use of the regression model. Having been trained to predict the output of the objective function based on the tunable parameter values, the system may make changes to the value of the selected cluster point and predict how the output of the objective function will change as a result. For instance, if the cluster point specifies a value for the focus voltage of x kV, the system might query the regression model to see how the objective function changes at a focus voltage of x+0.2 kV, x+5 kV, x+10 kV, etc.

After the selected parameter is adjusted, the system may determine the resulting predicted change in the objective function. If the objective function output does not change (is stable) or changes in a parabolic manner, then at block 644 the parameter value may be locked to a value in the stable region or at a maximum or minimum of the parabola. If the objective function output varies in a substantially linear fashion, then at block 646 the parameter may be flagged as a tunable parameter and may remain unlocked. If the objective function output varies, but in a non-linear fashion, then at block 650 the cluster may be removed from consideration (since the cluster cannot be used for predictable tuning).

If the cluster is not removed from consideration (processing passes through block 644 or block 646, then at block 648 the system may determine whether additional parameters remain to be evaluated. If so, then processing returns to block 640 and the next parameter of the cluster is selected for evaluation.

If no parameters remain to be evaluated, or if the cluster is eliminated from consideration at block 650, processing proceeds to block 652 where the system determines if additional clusters remain for evaluation. If so, processing returns to block 638 and the next cluster is selected. If not, then processing proceeds to block 654.

At block 654, the clusters that have not been eliminated from consideration are evaluated for sensitivity and stability. As a measure of stability, the system may consider how many parameters in the cluster have been locked (block 644); more locked parameters may be representative of a more stable configuration, although at least some parameters need to remain unlocked for tuning purposes. As a measure of sensitivity, the system may consider how many of the beam shape parameters were able to be manipulated using the tunable parameters that remained unlocked, and to what extent those parameters could be changed. The system may consider how close the tunable parameters were to a perfect linear fit, and may consider whether the linear fit had a relatively steep slope (where a small adjustment to the tunable parameter might cause a proportional but large change in the beam shape, making it difficult to achieve fine adjustments), a relatively shallow slope (requiring large adjustments to affect the beam shape, making it difficult to create a significant change to the beam shape), or a slope close to a predefined value (indicating a desired tunability that allows for fine tuning but also a reasonable amount of change with each adjustment).

The clusters may be scored based on the sensitivity and stability metrics. Furthermore, clusters with orthogonal tunable parameters (described above) may receive higher scores than clusters without orthogonal tunable parameters.

At block 656, the cluster with the best evaluation (e.g., the highest score) from block 654 may be selected as the most tunable configuration. Any locked parameters may be flagged and the values at which they are locked may be identified, and any tunable parameters may be set to a default value that achieves the desired beam shape (e.g., the value for the local optimum that defines the cluster). These values may be saved to a settings file and may be applied to the ion beam generator. In some embodiments, the settings file may be saved in a library so that the beam shape can be re-used; a user may select the settings file from the library to configure the ion beam generator with the beam shape defined by the settings file.

Processing may then proceed to done block 636 and terminate.

Figure 7:
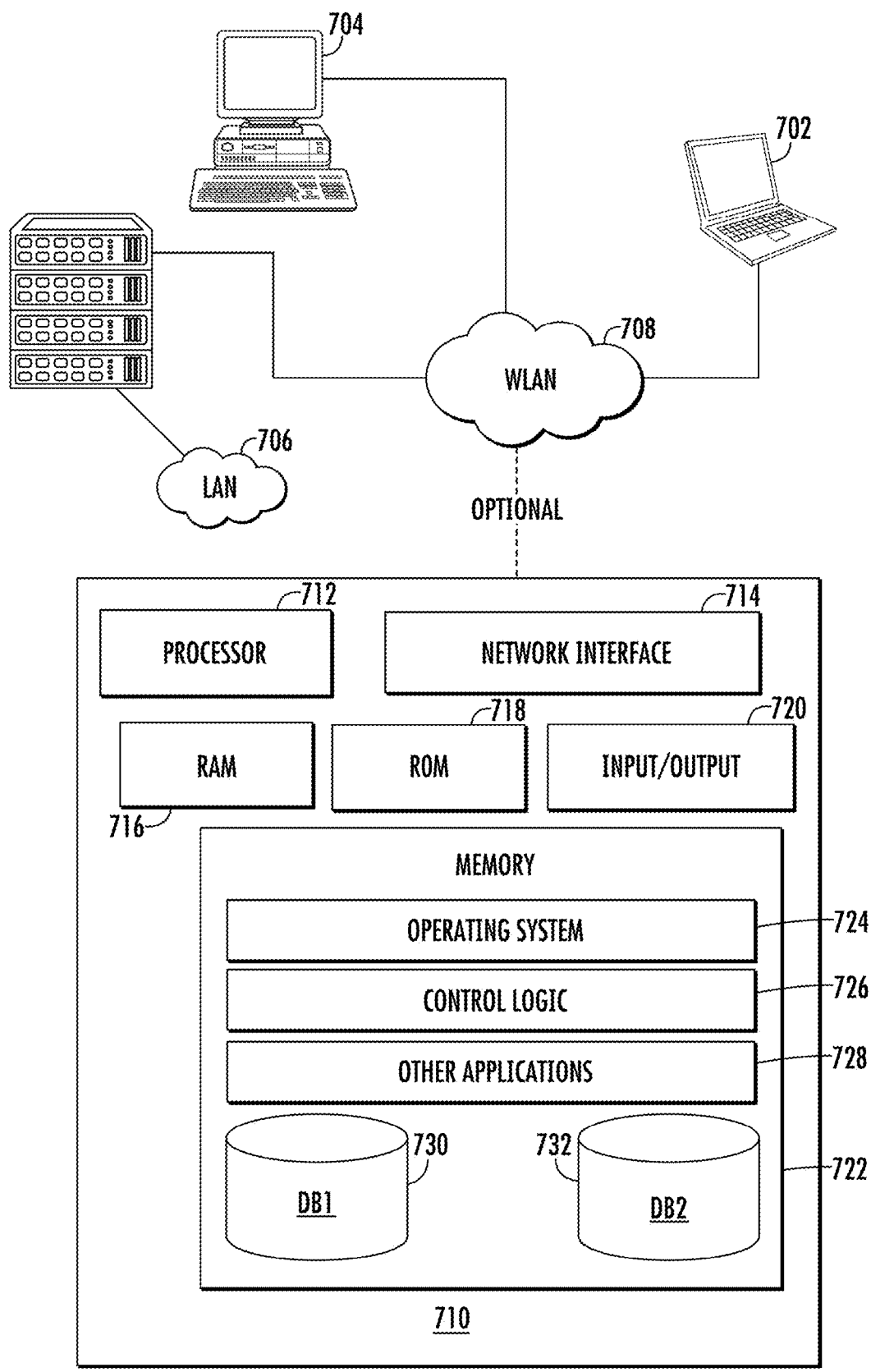
FIG. 7 depicts an illustrative computer system architecture that may be used to practice exemplary embodiments described herein.

FIG. 7 illustrates one example of a system architecture and data processing device that may be used to implement one or more illustrative aspects described herein in a stand-alone and/or networked environment. Various network nodes, such as the data server 710, web server 706, computer 704, and laptop 702 may be interconnected via a wide area network 708 (WAN), such as the internet. Other networks may also or alternatively be used, including private intranets, corporate networks, LANs, metropolitan area networks (MANs) wireless networks, personal networks (PANs), and the like. Network 708 is for illustration purposes and may be replaced with fewer or additional computer networks. A local area network (LAN) may have one or more of any known LAN topology and may use one or more of a variety of different protocols, such as ethernet. Devices data server 710, web server 706, computer 704, laptop 702 and other devices (not shown) may be connected to one or more of the networks via twisted pair wires, coaxial cable, fiber optics, radio waves or other communication media.

Computer software, hardware, and networks may be utilized in a variety of different system environments, including standalone, networked, remote-access (aka, remote desktop), virtualized, and/or cloud-based environments, among others.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 710, web server 706, and client computer 704, laptop 702. Data server 710 provides overall access, control and administration of databases and control software for performing one or more illustrative aspects described herein. Data server 710 may be connected to web server 706 through which users interact with and obtain data as requested. Alternatively, data server 710 may act as a web server itself and be directly connected to the internet. Data server 710 may be connected to web server 706 through the network 708 (e.g., the internet), via direct or indirect connection, or via some other network. Users may interact with the data server 710 using remote computer 704, laptop 702, e.g., using a web browser to connect to the data server 710 via one or more externally exposed web sites hosted by web server 706. Client computer 704, laptop 702 may be used in concert with data server 710 to access data stored therein or may be used for other purposes. For example, from client computer 704, a user may access web server 706 using an internet browser, as is known in the art, or by executing a software application that communicates with web server 706 and/or data server 710 over a computer network (such as the internet).

Servers and applications may be combined on the same physical machines, and retain separate virtual or logical addresses, or may reside on separate physical machines. FIG. 7 illustrates just one example of a network architecture that may be used, and those of skill in the art will appreciate that the specific network architecture and data processing devices used may vary, and are secondary to the functionality that they provide, as further described herein. For example, services provided by web server 706 and data server 710 may be combined on a single server.

Each component data server 710, web server 706, computer 704, laptop 702 may be any type of known computer, server, or data processing device. Data server 710, e.g., may include a processor 712 controlling overall operation of the data server 710. Data server 710 may further include RAM 716, ROM 718, network interface 714, input/output interfaces 720 (e.g., keyboard, mouse, display, printer, etc.), and memory 722. Input/output interfaces 720 may include a variety of interface units and drives for reading, writing, displaying, and/or printing data or files. Memory 722 may further store operating system software 724 for controlling overall operation of the data server 710, control logic 726 for instructing data server 710 to perform aspects described herein, and other application software 728 providing secondary, support, and/or other functionality which may or may not be used in conjunction with aspects described herein. The control logic may also be referred to herein as the data server software control logic 726. Functionality of the data server software may refer to operations or decisions made automatically based on rules coded into the control logic, made manually by a user providing input into the system, and/or a combination of automatic processing based on user input (e.g., queries, data updates, etc.).

Memory 1122 may also store data used in performance of one or more aspects described herein, including a first database 732 and a second database 730. In some embodiments, the first database may include the second database (e.g., as a separate table, report, etc.). That is, the information can be stored in a single database, or separated into different logical, virtual, or physical databases, depending on system design. Web server 706, computer 704, laptop 702 may have similar or different architecture as described with respect to data server 710. Those of skill in the art will appreciate that the functionality of data server 710 (or web server 706, computer 704, laptop 702) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution or may be written in a scripting language such as (but not limited to) HTML or XML. The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It will be appreciated that the exemplary devices shown in the block diagrams described above may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

At least one computer-readable storage medium may include instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to convey the substance of their work most effectively to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose or it may comprise a general-purpose computer as selectively activated or reconfigured by a computer program stored in the computer. The procedures presented herein are not inherently related to a particular computer or other apparatus. Various general-purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A computer-implemented method, comprising:
   receiving one or more desired beam shape parameters for an ion beam and one or more tunable parameters for an ion beam generator configured to generate the ion beam;
   selecting a set of exploratory points within a search space, each point in the search space representing a combination of values for the tunable parameters;
   for each of the exploratory points, receiving measured beam shape parameters based on the combination of values for the tunable parameters defined by the respective exploratory point;
   training a regression model configured to provide predicted beam shape parameters for a predetermined number of interpolated points between spaced around the exploratory points;
   defining a plurality of clusters within the search space based on the predicted beam shape parameters and the measured beam shape parameters;
   evaluating the plurality of clusters for at least one of a stability or a sensitivity of the tunable parameters within each respective cluster;
   selecting one of the plurality of clusters based on the evaluating; and
   outputting tuning settings for the combination of values for the tunable parameters corresponding to the selected cluster.

2. The computer-implemented method of claim 1, wherein the regression model is further configured to provide a confidence value for each of the interpolated points, and further comprising:
   identifying that one of the plurality of clusters is associated with a low-confidence interpolated point having a confidence value above or below a predetermined confidence interval; and
   receiving a measurement of a shape of the ion beam using the combination of values of the tunable parameters defined by the low-confidence interpolated point.

3. The computer-implemented method of claim 1, wherein evaluating the plurality of clusters comprises:
   selecting a cluster and identifying the combination of values of the tunable parameters for the selected cluster;
   adjusting a value of a first one of the tunable parameters; and
   identifying an effect of the adjusting on a value for a shape of the ion beam.

4. The computer-implemented method of claim 3, wherein adjusting the first one of the tunable parameters causes the value for the shape of the ion beam to move non-linearly, and further comprising discarding the selected cluster from consideration.

5. The computer-implemented method of claim 3, wherein adjusting the first one of the tunable parameters causes the value for the shape of the ion beam to move by less than a predetermined threshold amount, or causes the value for the shape of the ion beam to move parabolically, and further comprising selecting a value for the first one of the tunable parameters and locking the first one of the tunable parameters at the selected value.

6. The computer-implemented method of claim 5, wherein selecting one of the plurality of clusters based on the evaluating comprises selecting a cluster having a greatest number of tunable parameters having values that have been locked in place.

7. The computer-implemented method of claim 1, wherein selecting one of the plurality of clusters based on the evaluating comprises:
   identifying that a first tunable parameter of a cluster under evaluation has a linear effect on a first one of the beam shape parameters and a neutral effect on a second one of the beam shape parameters;
   identifying that a second tunable parameter of the cluster under evaluation has a neutral effect on the first one of the beam shape parameters and a linear effect on a the second one of the beam shape parameters; and
   selecting the cluster under evaluation.

8. A non-transitory computer-readable storage medium, the computer-readable storage medium including instructions that when executed by a computer, cause the computer to:
   receive one or more desired beam shape parameters for an ion beam and one or more tunable parameters for an ion beam generator configured to generate the ion beam;
   select a set of exploratory points within a search space, each point in the search space representing a combination of values for the tunable parameters;
   for each of the exploratory points, receive measured beam shape parameters based on the combination of values for the tunable parameters defined by the respective exploratory point;
   train a regression model configured to provide predicted beam shape parameters for a predetermined number of interpolated points between the exploratory points;
   define a plurality of clusters within the search space based on the predicted beam shape parameters and the measured beam shape parameters;
   evaluate the plurality of clusters for at least one of a stability or a sensitivity of the tunable parameters within each respective cluster;
   select one of the plurality of clusters based on the evaluating; and
   output tuning settings for the combination of values for the tunable parameters corresponding to the selected cluster.

9. The computer-readable storage medium of claim 8, wherein the regression model is further configured to provide a confidence value for each of the interpolated points, and wherein the instructions further configure the computer to:
   identify that one of the plurality of clusters is associated with a low-confidence interpolated point having a confidence value above or below a predetermined confidence interval; and
   receive a measurement of a shape of the ion beam using the combination of values of the tunable parameters defined by the low-confidence interpolated point.

10. The computer-readable storage medium of claim 8, wherein evaluating the plurality of clusters comprises:
    select a cluster and identifying the combination of values of the tunable parameters for the selected cluster;
    adjust a value of a first one of the tunable parameters; and
    identify an effect of the adjusting on a value for a shape of the ion beam.

11. The computer-readable storage medium of claim 10, wherein adjusting the first one of the tunable parameters causes the value for the shape of the ion beam to move non-linearly, and wherein the instructions further configure the computer to discard the selected cluster from consideration.

12. The computer-readable storage medium of claim 10, wherein adjusting the first one of the tunable parameters causes the value for the shape of the ion beam to move by less than a predetermined threshold amount, or causes the value for the shape of the ion beam to move parabolically, and wherein the instructions further configure the computer to select a value for the first one of the tunable parameters and locking the first one of the tunable parameters at the selected value.

13. The computer-readable storage medium of claim 12, wherein selecting one of the plurality of clusters based on the evaluating comprises selecting a cluster having a greatest number of tunable parameters having values that have been locked in place.

14. The computer-readable storage medium of claim 8, wherein selecting one of the plurality of clusters based on the evaluating comprises:
    identify that a first tunable parameter of a cluster under evaluation has a linear effect on a first one of the beam shape parameters and a neutral effect on a second one of the beam shape parameters;
    identify that a second tunable parameter of the cluster under evaluation has a neutral effect on the first one of the beam shape parameters and a linear effect on a the second one of the beam shape parameters; and
    select the cluster under evaluation.

15. A computing apparatus comprising:
    a processor; and
    a memory storing instructions that, when executed by the processor, configure the apparatus to:
        receive one or more desired beam shape parameters for an ion beam and one or more tunable parameters for an ion beam generator configured to generate the ion beam;
        select a set of exploratory points within a search space, each point in the search space representing a combination of values for the tunable parameters;
        for each of the exploratory points, receive measured beam shape parameters based on the combination of values for the tunable parameters defined by the respective exploratory point;
        train a regression model configured to provide predicted beam shape parameters for a predetermined number of interpolated points between the exploratory points;
        define a plurality of clusters within the search space based on the predicted beam shape parameters and the measured beam shape parameters;
        evaluate the plurality of clusters for at least one of a stability or a sensitivity of the tunable parameters within each respective cluster;
        select one of the plurality of clusters based on the evaluating; and
        output tuning settings for the combination of values for the tunable parameters corresponding to the selected cluster.

16. The computing apparatus of claim 15, wherein the regression model is further configured to provide a confidence value for each of the interpolated points, and wherein the instructions further configure the apparatus to:
    identify that one of the plurality of clusters is associated with a low-confidence interpolated point having a confidence value above or below a predetermined confidence interval; and
    receive a measurement of a shape of the ion beam using the combination of values of the tunable parameters defined by the low-confidence interpolated point.

17. The computing apparatus of claim 15, wherein evaluating the plurality of clusters comprises:
    selecting a cluster and identifying the combination of values of the tunable parameters for the selected cluster;
    adjusting a value of a first one of the tunable parameters; and
    identifying an effect of the adjusting on a value for a shape of the ion beam.

18. The computing apparatus of claim 17, wherein adjusting the first one of the tunable parameters causes the value for the shape of the ion beam to move non-linearly, and wherein the instructions further configure the apparatus to discard the selected cluster from consideration.

19. The computing apparatus of claim 17, wherein:
    adjusting the first one of the tunable parameters causes the value for the shape of the ion beam to move by less than a predetermined threshold amount, or causes the value for the shape of the ion beam to move parabolically,
    the instructions further configure the apparatus to select a value for the first one of the tunable parameters and locking the first one of the tunable parameters at the selected value, and
    selecting one of the plurality of clusters based on the evaluating comprises selecting a cluster having a greatest number of tunable parameters having values that have been locked in place.

20. The computing apparatus of claim 15, wherein selecting one of the plurality of clusters based on the evaluating comprises:
    identify that a first tunable parameter of a cluster under evaluation has a linear effect on a first one of the beam shape parameters and a neutral effect on a second one of the beam shape parameters;
    identify that a second tunable parameter of the cluster under evaluation has a neutral effect on the first one of the beam shape parameters and a linear effect on a the second one of the beam shape parameters; and
    select the cluster under evaluation.

21. An ion implanter, comprising:
    an ion beam generator to generate an ion beam;
    at least one beamline component to direct the ion beam towards a substrate;
    a processing circuitry; and
    a memory communicatively coupled to the processing circuitry, the memory storing instructions that, when executed by the processing circuitry, causes the processing circuitry to:
        receive one or more desired beam shape parameters for the ion beam and one or more tunable parameters for the ion beam generator configured to generate the ion beam;
        select a set of exploratory points within a search space, each point in the search space representing a combination of values for the tunable parameters;
        for each of the exploratory points, receive measured beam shape parameters based on the combination of values for the tunable parameters defined by the respective exploratory point;
        train a regression model configured to provide predicted beam shape parameters for a predetermined number of interpolated points between the exploratory points;
        define a plurality of clusters within the search space based on the predicted beam shape parameters and the measured beam shape parameters;
        evaluate the plurality of clusters for at least one of a stability or a sensitivity of the tunable parameters within each respective cluster;

select one of the plurality of clusters based on the evaluating; and output tuning settings for the combination of values for the tunable parameters corresponding to the selected cluster.

\* \* \* \* \*

UNITED STATES PATENT AND TRADEMARK OFFICE
CERTIFICATE OF CORRECTION

PATENT NO. : 12,340,967 B2
APPLICATION NO. : 17/375488
DATED : June 24, 2025
INVENTOR(S) : Richard Allen Sprenkle Page 1 of 1

It is certified that error appears in the above-identified patent and that said Letters Patent is hereby corrected as shown below:

In the Claims

Column 25, Line 16, replace "points between spaced around" with --points between--.

Signed and Sealed this
Second Day of September, 2025

Coke Morgan Stewart
*Acting Director of the United States Patent and Trademark Office*